United States Patent
Azuma et al.

(10) Patent No.: US 7,486,806 B2
(45) Date of Patent: Feb. 3, 2009

(54) IRIS ENCODING METHOD, INDIVIDUAL AUTHENTICATION METHOD, IRIS CODE REGISTRATION DEVICE, IRIS AUTHENTICATION DEVICE, AND IRIS AUTHENTICATION PROGRAM

(75) Inventors: Takeo Azuma, Nara (JP); Kenji Kondo, Kyoto (JP); Masahiro Wakamori, Kanagawa (JP)

(73) Assignee: Panasonic Corporation, Osaka (JP)

( * ) Notice: Subject to any disclaimer, the term of this patent is extended or adjusted under 35 U.S.C. 154(b) by 698 days.

(21) Appl. No.: 10/495,739

(22) PCT Filed: Sep. 12, 2003

(86) PCT No.: PCT/JP03/11681

§ 371 (c)(1),
(2), (4) Date: May 17, 2004

(87) PCT Pub. No.: WO2004/025565

PCT Pub. Date: Mar. 25, 2004

(65) Prior Publication Data

US 2005/0008200 A1   Jan. 13, 2005

(30) Foreign Application Priority Data

Sep. 13, 2002   (JP)   .............................. 2002-268569

(51) Int. Cl.
*G06K 9/00* (2006.01)
(52) U.S. Cl. ...................... 382/117; 359/857; 340/5.82
(58) Field of Classification Search .................. 382/117
See application file for complete search history.

(56) References Cited

U.S. PATENT DOCUMENTS

| 5,291,560 | A | * | 3/1994 | Daugman | .................... 382/117 |
| 6,404,903 | B2 | * | 6/2002 | Okano et al. | ................. 382/117 |
| 6,549,118 | B1 | * | 4/2003 | Seal et al. | ................... 340/5.82 |
| 7,099,495 | B2 | * | 8/2006 | Kodno et al. | ................. 382/117 |

(Continued)

FOREIGN PATENT DOCUMENTS

JP   8-504979 A   5/1996

(Continued)

OTHER PUBLICATIONS

"High Confidence Visual Recognition of Persons by a Test of Statistical Independence", John G. Daugman, IEEE Transactions of Pattern Analysis and Machine Intelligence, vol. 15, No. 11, Nov. 1993.

(Continued)

*Primary Examiner*—Samir A. Ahmed
*Assistant Examiner*—Aklilu K Woldemariam
(74) *Attorney, Agent, or Firm*—Harness, Dickey & Pierce, P.L.C.

(57) ABSTRACT

In iris authentication, iris regions are extracted from a plurality of images (2a, 2b). The extracted iris regions are subjected to polar coordinate transformation (3a, 3b) and band limitation (4a, 4b). Thereafter, an iris code is generated from the coordinate-transformed, band-limited iris regions (5a, 5b). The iris code is subjected to rotational compensation (6a, 6b). A plurality of resultant iris codes are synthesized into a single iris code by determining the bit value of each bit based on a majority rule (7a, 7b).

12 Claims, 19 Drawing Sheets

U.S. PATENT DOCUMENTS

| | | | |
|---|---|---|---|
| 7,155,035 B2 * | 12/2006 | Kondo et al. | 382/117 |
| 2001/0026632 A1 * | 10/2001 | Tamai | 382/117 |
| 2002/0118864 A1 * | 8/2002 | Kondo et al. | 382/117 |
| 2003/0152252 A1 * | 8/2003 | Kondo et al. | 382/117 |
| 2007/0091486 A1 * | 4/2007 | Dowski et al. | 359/857 |

FOREIGN PATENT DOCUMENTS

| | | |
|---|---|---|
| JP | 8-339443 A | 12/1996 |
| JP | 10-177651 | 6/1998 |
| JP | 10-208050 A | 8/1998 |
| WO | WO-94/09446 | 4/1994 |

OTHER PUBLICATIONS

International Search Report for PCT/JP03/11681, mailed Dec. 16, 2003, ISA/JPO.

* cited by examiner xy-rectangular coordinate system

Extracted iris region enclosed by iris perimeter and pupil perimeter r θ -polar coordinate system Pupil perimeter Iris perimeter (a) Original signal (b) After being subjected to Gabor filter (c)

IRIS ENCODING METHOD, INDIVIDUAL AUTHENTICATION METHOD, IRIS CODE REGISTRATION DEVICE, IRIS AUTHENTICATION DEVICE, AND IRIS AUTHENTICATION PROGRAM

TECHNICAL FIELD

The present invention relates to a personal authentication technique that uses iris information, which is one of the biometric information.

BACKGROUND ART

Various personal authentication methods which use biometric information of an iris, fingerprint, face, etc., have been proposed. In recent years, a personal authentication technique utilizing iris recognition has been started to be used for entrance/exit management in a restricted building, bank ATMs (Automated Teller Machines), PC login applications, etc.

Personal authentication using an iris is for example implemented by the following steps (see Japanese Unexamined PCT National Phase Publication No. 8-504979 (hereinafter, referred to as Document 1)):

1. Irradiate an iris using near-infrared LED, or the like, to obtain an iris image;
2. Detect the pupil/iris border and iris/sclera (white portion) border to extract an iris region;
3. Transform pixel coordinate values of the iris region from rectangular coordinates to polar coordinates;
4 Gabor-transform the brightness of the coordinate-transformed iris region;
5. Binarize the real part and imaginary part of the output of the Gabor transform to generate an iris code;
6. Generate an iris code for a registrant through above steps 1 to 5 to register the iris code in a registration database; and
7 Generate an iris code for a person who is to be authenticated through above steps 1 to 5 and compare the generated iris code with the iris code in the registration database to determine, based on differences between the iris codes, whether or not he/she is a person who has been registered in the registration database.

Near-infrared light is used for irradiation at step 1 because it is not perceived by a human eye, and therefore, a person who is to be authenticated does not feel glare. Almost all the people on the earth have brown irises (some races have blue or gray irises, but they are minorities in the world), and the iris pattern of brown irises can be captured with high contrast under near-infrared light although it is difficult to visually identify the iris patter of brown irises under visible light. It should be noted that the iris pattern of blue or gray irises can also be captured under near-infrared light.

DISCLOSURE OF INVENTION

Problems to be Solved by the Invention

In recent years, mobile terminals, such as cellular mobile phones, PDAs, etc., have been rapidly widespread. It is expected that authentication using such mobile terminals (mobile authentication) will be widespread in the future. In the case of a mobile terminal, a camera incorporated therein has relatively low quality (low S/N) because of cost and size restrictions.

In the case where the above-described conventional method is carried out with a low-S/N camera, there is a high possibility that a difference occurs between the iris code generated at the time of registration and the iris code generated at the time of authentication, due to bit inversion of iris codes which is caused by video noise, a variation in the pupil diameter, or the like. If this difference exceeds a predetermined threshold value, a registered person is not authenticated as he/she is, i.e., so-called false rejection (FR) occurs. That is, the false rejection rate increases because of the low S/N of the camera.

In view of the above problems, an objective of the present invention is to reduce the occurrence of false rejection in personal authentication which uses iris images even when a low S/N camera is used.

Means for Achieving the Objective

For the purpose of achieving the above objective, according to the present invention, iris codes obtained from a plurality of images are subjected to rotational compensation and then synthesized into a single iris code by determining the bit value of each bit based on a majority rule. Thus, the accuracy of each bit of a finally-obtained iris code is improved, and iris codes are stably obtained.

Alternatively, according to the present invention, iris regions are extracted from a plurality of images, and the extracted iris regions are subjected to polar coordinate transformation, band limitation, and rotational compensation. Thereafter, a plurality of resultant images are added together and accumulated as a single image. Then, an iris code is generated from the accumulated image. Thus, noise components are canceled by each other at the time of accumulation of the image even when the S/N of each of original images is not sufficiently high. Therefore, the S/N is ameliorated, and a single image having a high S/N is obtained. As a result, stable iris codes are generated.

Still alternatively, according to the present invention, iris regions are extracted from a plurality of images. The extracted iris regions are subjected to polar coordinate transformation and rotational compensation. A plurality of resultant images are added together and accumulated as a single image. Band limitation is performed on the accumulated image, and then, an iris code is generated from the band-limited image. Thus, noise components are canceled by each other at the time of accumulation of the image even when the S/N of each of original images is not sufficiently high. Therefore, the S/N is ameliorated, and a single image having a high S/N is obtained. As a result, stable iris codes are generated.

Effects of the Invention

An iris code generation method of the present invention is unsusceptible to the influence of video noise, and the like, and therefore stably generates iris codes. Thus, occurrence of false rejection (FR) is suppressed to a low rate even when images are captured with a low S/N camera. That is, stable personal authentication is realized even with a less expensive camera. Therefore, the present invention has large practical effects.

BEST MODE FOR CARRYING OUT THE INVENTION

Figure 1:
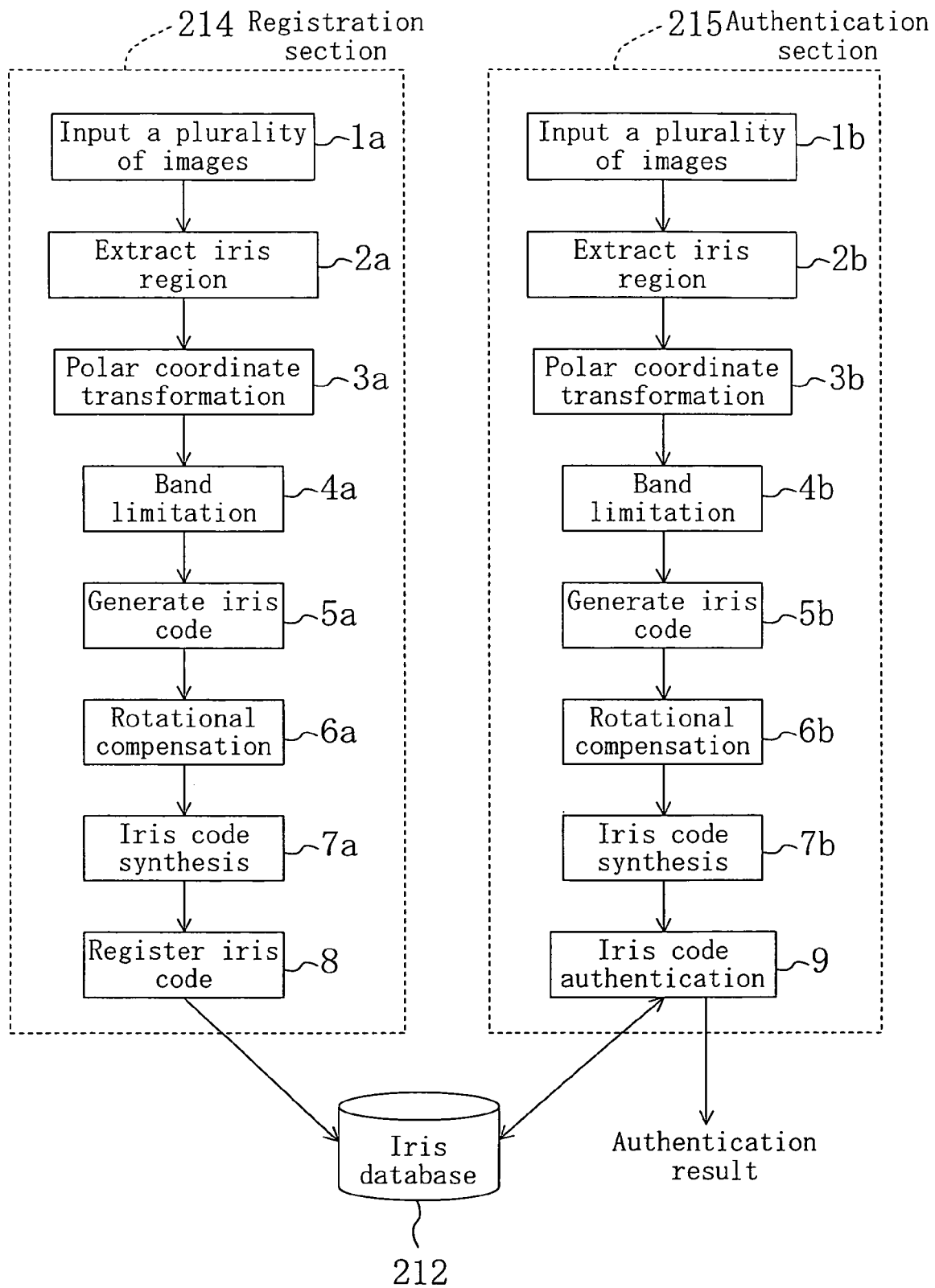
FIG. 1 is a flowchart illustrating an iris authentication method according to embodiment 1 of the present invention.

The first example of the present invention provides an iris code generation method, comprising the steps of: inputting a plurality of images; detecting iris regions from the plurality of images; transforming coordinate system from a rectangular coordinate system to a polar coordinate system for an image of each of the detected iris regions; performing band limitation on each of the coordinate-transformed images; generating an iris code from each of the band-limited images; rotationally compensating each of the generated iris codes in a circumferential direction; and synthesizing the rotationally-compensated iris codes into a single iris code by determining a bit value of each bit based on a majority rule.

The second example of the present invention provides an iris code generation method, comprising the steps of: inputting a plurality of images; detecting iris regions from the plurality of images; transforming coordinate system from a rectangular coordinate system to a polar coordinate system for an image of each of the detected iris regions; performing band limitation on each of the coordinate-transformed images; rotationally compensating each of the band-limited images in a circumferential direction; adding together the rotationally-compensated images to accumulate them as a single image; and generating an iris code from the accumulated image.

The third example of the present invention provides an iris code generation method, comprising the steps of: inputting a plurality of images; detecting iris regions from the plurality of images; transforming coordinate system from a rectangular coordinate system to a polar coordinate system for an image of each of the detected iris regions; rotationally compensating each of the coordinate-transformed images in a circumferential direction; adding together the rotationally-compensated images to accumulate them as a single image; performing band limitation on the accumulated image; and generating an iris code from the band-limited image.

The fourth example of the present invention provides the iris code generation method of any one of the first to third examples wherein the band limitation is realized by Gabor transform.

The fifth example of the present invention provides a personal authentication method using an iris image, comprising a registration process and an authentication process, the registration process including the steps of: generating an iris code from an iris image; and registering the generated iris code in a database, the authentication process including the steps of: generating an iris code from an iris image; and comparing the generated iris code with the iris code registered in the database to perform authentication, wherein, in at least one of the registration process and the authentication process, generation of the iris code is performed using the iris code generation method of any one of the first to third examples.

The sixth example of the present invention provides an iris code registration device, comprising: an image input section; an iris region extraction section for detecting an iris region from an image input to the image input section; a polar coordinate transformation section for transforming coordinate system from a rectangular coordinate system to a polar coordinate system for an image of the iris regions obtained by the iris region extraction section; a band limitation section for performing band limitation on the coordinate-transformed image output from the polar coordinate transformation section; an iris code generation section for generating an iris code from the band-limited image output from the band limitation section; a rotational compensation section for rotationally compensating the iris code output from the iris code generation section in a circumferential direction; an iris code synthesis section for receiving a plurality of rotationally-compensated iris codes output from the rotational compensation section and synthesizing the plurality of iris codes into a single iris code by determining a bit value of each bit based on a majority rule; and an iris code registration section for registering the iris code output from the iris code synthesis section in a database.

The seventh example of the present invention provides an iris code registration device, comprising: an image input section; an iris region extraction section for detecting an iris region from an image input to the image input section; a polar coordinate transformation section for transforming coordinate system from a rectangular coordinate system to a polar coordinate system for an image of the iris regions obtained by the iris region extraction section; a band limitation section for performing band limitation on the coordinate-transformed image output from the polar coordinate transformation section; a rotational compensation section for rotationally compensating the band-limited image output from the band limitation section in a circumferential direction; an image accumulation section for receiving a plurality of rotationally-compensated images output from the rotational compensation section and adding together the plurality of rotationally-compensated images to accumulate them as a single image; an iris code generation section for generating an iris code from the image accumulated in the image accumulation section; and an iris code registration section for registering the iris code output from the iris code generation section in a database.

The eighth example of the present invention provides an iris code registration device, comprising: an image input section; an iris region extraction section for detecting an iris region from an image input to the image input section; a polar coordinate transformation section for transforming coordinate system from a rectangular coordinate system to a polar coordinate system for an image of the iris regions obtained by the iris region extraction section; a rotational compensation section for rotationally compensating the coordinate-transformed image output from the polar coordinate transformation section in a circumferential direction; an image accumulation section for receiving a plurality of rotationally-compensated images output from the rotational compensation section and adding together the plurality of rotationally-compensated images to accumulate them as a single image; a band limitation section for performing band limitation on the image accumulated in the image accumulation section; an iris code generation section for generating an iris code from the image output from the band limitation section; and an iris code registration section for registering the iris code output from the iris code generation section in a database.

The ninth example of the present invention provides an iris authentication device, comprising: an image input section; an iris region extraction section for detecting an iris region from an image input to the image input section; a polar coordinate transformation section for transforming coordinate system from a rectangular coordinate system to a polar coordinate system for an image of the iris regions obtained by the iris region extraction section; a band limitation section for performing band limitation on the coordinate-transformed image output from the polar coordinate transformation section; an iris code generation section for generating an iris code from the band-limited image output from the band limitation section; a rotational compensation section for rotationally compensating the iris code output from the iris code generation section in a circumferential direction; an iris code synthesis section for receiving a plurality of rotationally-compensated iris codes output from the rotational compensation section and synthesizing the plurality of iris codes into a single iris code by determining the bit value of each bit based on a majority rule; and an iris code authentication section for comparing the iris code output from the iris code synthesis section with an iris code registered in a database to perform authentication.

The tenth example of the present invention provides an iris authentication device, comprising: an image input section; an iris region extraction section for detecting an iris region from an image input to the image input section; a polar coordinate transformation section for transforming coordinate system from a rectangular coordinate system to a polar coordinate system for an image of the iris regions obtained by the iris region extraction section; a band limitation section for performing band limitation on the coordinate-transformed image output from the polar coordinate transformation section; a rotational compensation section for rotationally compensating the band-limited image output from the band limitation section in a circumferential direction; an image accumulation section for receiving a plurality of rotationally-compensated images output from the rotational compensation section and adding together the plurality of rotationally-compensated images to accumulate them as a single image; an iris code generation section for generating an iris code from the image accumulated in the image accumulation section; and an iris code authentication section for comparing the iris code output from the iris code generation section with an iris code registered in a database to perform authentication.

The eleventh example of the present invention provides an iris authentication device, comprising: an image input section; an iris region extraction section for detecting an iris region from an image input to the image input section; a polar coordinate transformation section for transforming coordinate system from a rectangular coordinate system to a polar coordinate system for an image of the iris regions obtained by the iris region extraction section; a rotational compensation section for rotationally compensating the coordinate-transformed image output from the polar coordinate transformation section in a circumferential direction; an image accumulation section for receiving a plurality of rotationally-compensated images output from the rotational compensation section and adding together the plurality of rotationally-compensated images to accumulate them as a single image; a band limitation section for performing band limitation on the image accumulated in the image accumulation section; an iris code generation section for generating an iris code from the image output from the band limitation section; and an iris code authentication section for comparing the iris code output from the iris code generation section with an iris code registered in a database to perform authentication.

The twelfth example of the present invention provides an iris authentication program for instructing a computer to execute: an iris code generation step of generating an authentication iris code using the iris code generation method of any one of the first to third examples; and an authentication step of comparing the authentication iris code with an iris code registered in a database to perform authentication.

Hereinafter, embodiments of the present invention are described with reference to the drawings.

EMBODIMENT 1

A cellular mobile phone is an example of a mobile terminal. Herein, embodiment 1 is described with an example of a cellular mobile phone having an authentication function.

Figure 2:
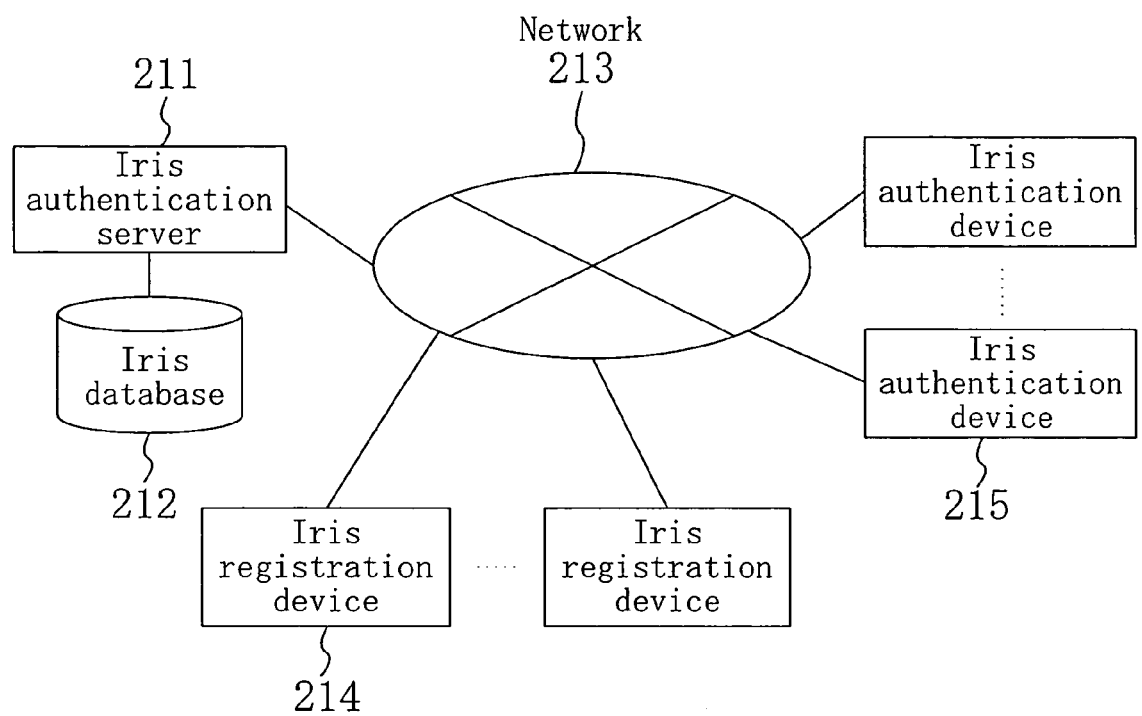
FIG. 2 shows an entire iris authentication system of the present invention.

FIG. 1 is a flowchart illustrating a personal authentication method which utilizes iris authentication according to embodiment 1 of the present invention. FIG. 2 shows an entire iris authentication system of the present invention. In embodiment 1, a user (person who is to be authenticated) performs iris authentication using a cellular mobile phone of FIG. 3 which has an authentication function.

In FIG. 2, an iris authentication server 211 has an iris database 212 for storing iris feature amount data of a plurality of persons and is connected to a network 213, such as the Internet, a private line, a public network, or the like. An iris registration device 214 and iris authentication device 215 are also connected to the network 213. The function of the iris authentication server 211 is to manage the iris database 212. The iris registration device 214 transmits an iris code generated at the time of registration (in the registration process) to the iris database 212. The iris authentication device 215 compares an iris code generated at the time of authentication (in the authentication process) with the iris code obtained from the iris database 212, which has been generated at the time of registration, thereby performing personal authentication.

It should be noted that each region or each organization which utilizes the iris personal authentication system may have one iris authentication servers 211 or may have a plurality of iris authentication servers 211 including mirror servers for load distribution. The iris database 212 may be connected to the iris authentication server 211 through a network.

The iris registration device 214 may only capture an iris image for registration and send the captured image to the iris authentication server 211, and in such a case, generation of an iris code may be performed in the iris authentication server 211. Alternatively, all of the functions of the iris registration device 214 may be incorporated in the iris authentication server 211.

The iris authentication device 215 may only captures an iris image for authentication and send the captured image to the iris authentication server 211, and in such a case, generation of an iris code may be performed in the iris authentication server 211. In an alternative example, the comparison of the authentication iris code with the registered iris code is also performed in the iris authentication server 211, and the iris authentication device 215 receives only a result of authentication. Alternatively, the iris authentication device 215 may have all of the functions of FIG. 2 to perform registration, storage of iris data, and authentication.

Figure 3:
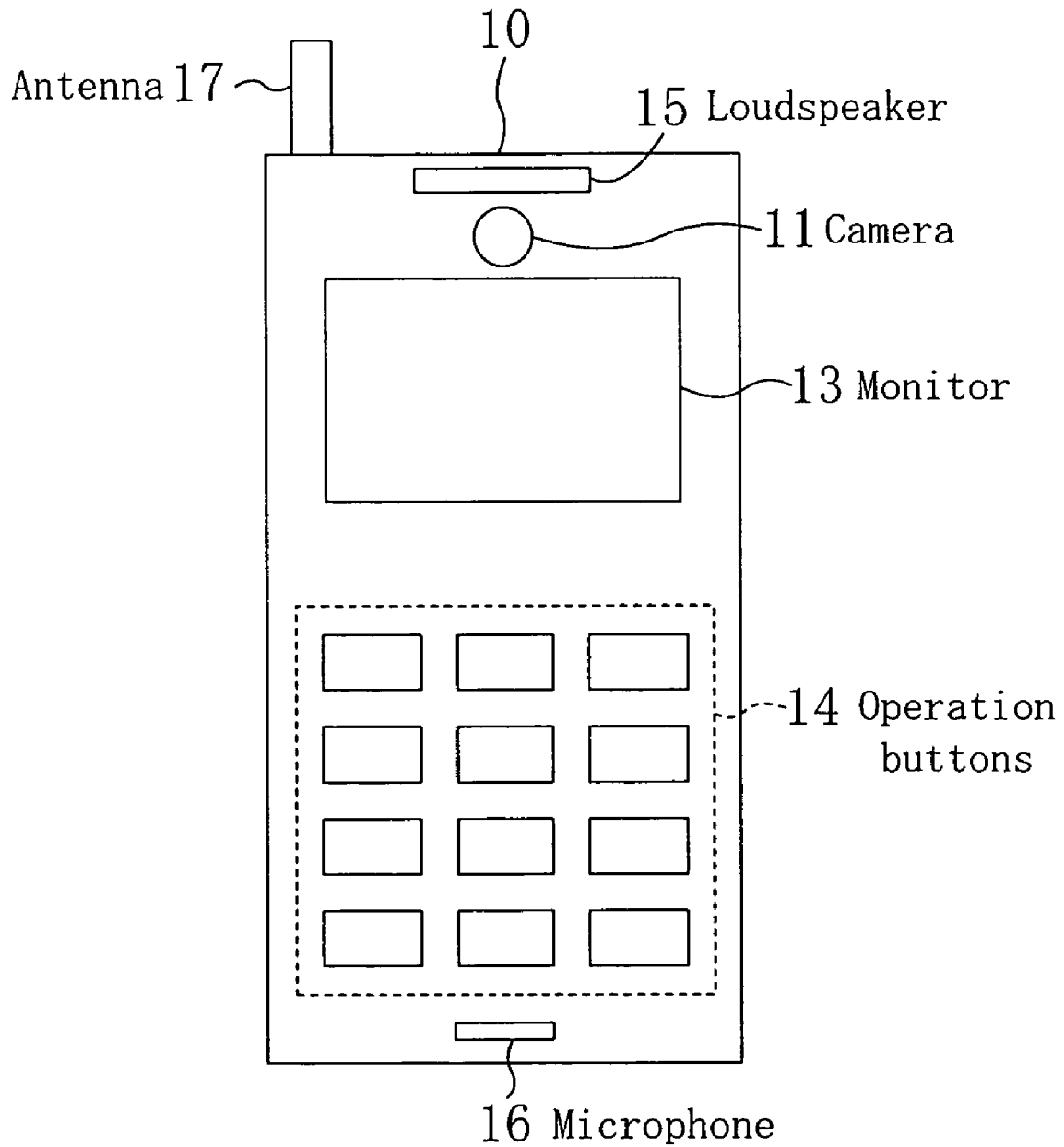
FIG. 3 shows the appearance of a cellular mobile phone having an authentication function according to embodiments of the present invention.

The cellular mobile phone 10 having an authentication function, which is shown in FIG. 3, is a commonly-employed cellular mobile phone which has a camera 11 for capturing an iris image. Examples of the size (number of pixels) of an image captured by the camera 11 include CIF size (352 pixels×288 pixels), QVGA size (320 pixels×240 pixels), VGA size (640 pixels×480 pixels), SVGA size (800 pixels×600 pixels), XGA size (1024 pixels×768 pixels), SXGA size (1240 pixels×1024 pixels), UXGA size (1600 pixels×1200 pixels), etc. In addition to the camera 11, the cellular mobile phone 10 includes a monitor 13, operation buttons 14, a loudspeaker 15, a microphone 16, an antenna 17, etc. The monitor 13 displays an iris image which is being captured and a result of authentication.

Figure 4:
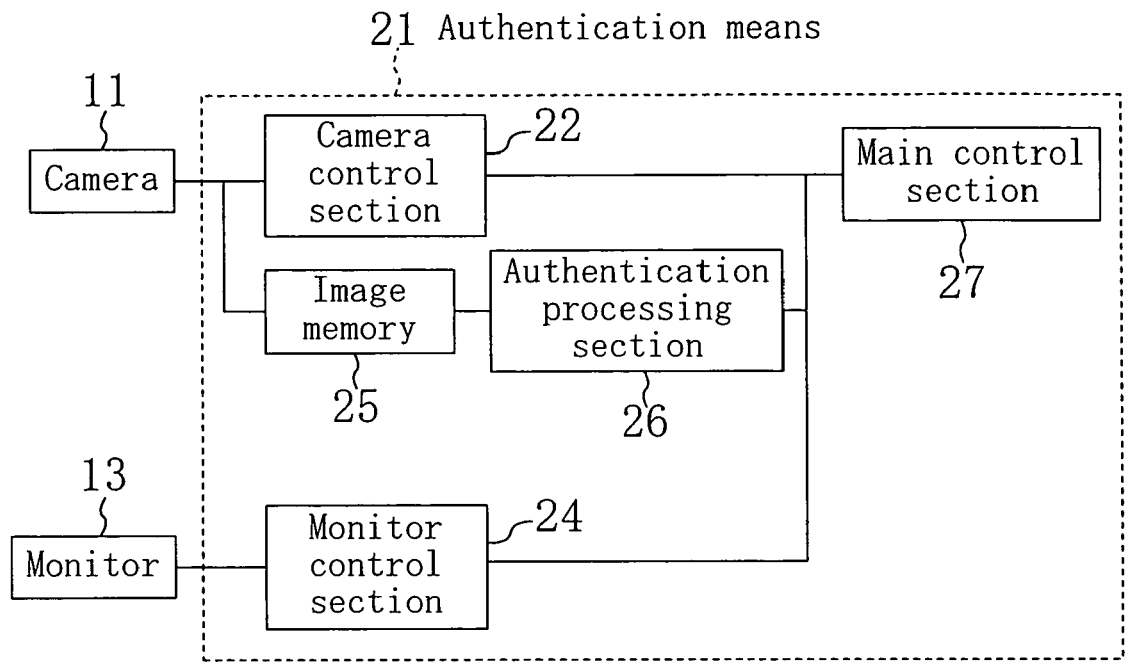
FIG. 4 schematically shows an internal structure of the cellular mobile phone of FIG. 3.

Referring to the internal structure shown in FIG. 4, in authentication means 21, a camera control section 22, a monitor control section 24 and an authentication processing section 26 are connected to a main control section 27. The camera control section 22 controls the camera 11 to capture iris images, and the captured iris images are accumulated in an image memory 25. The authentication processing section 26 performs an authentication process using the iris images accumulated in the image memory 25.

Hereinafter, the process of the personal authentication method of embodiment 1 is described according to the flow of FIG. 1. FIG. 1 shows both the flow of the process performed in the registration section (iris registration device) 214 and the flow of the process performed in the authentication section (iris authentication device) 215. Herein, the process in the authentication section 215 is described as an example.

Figure 19:
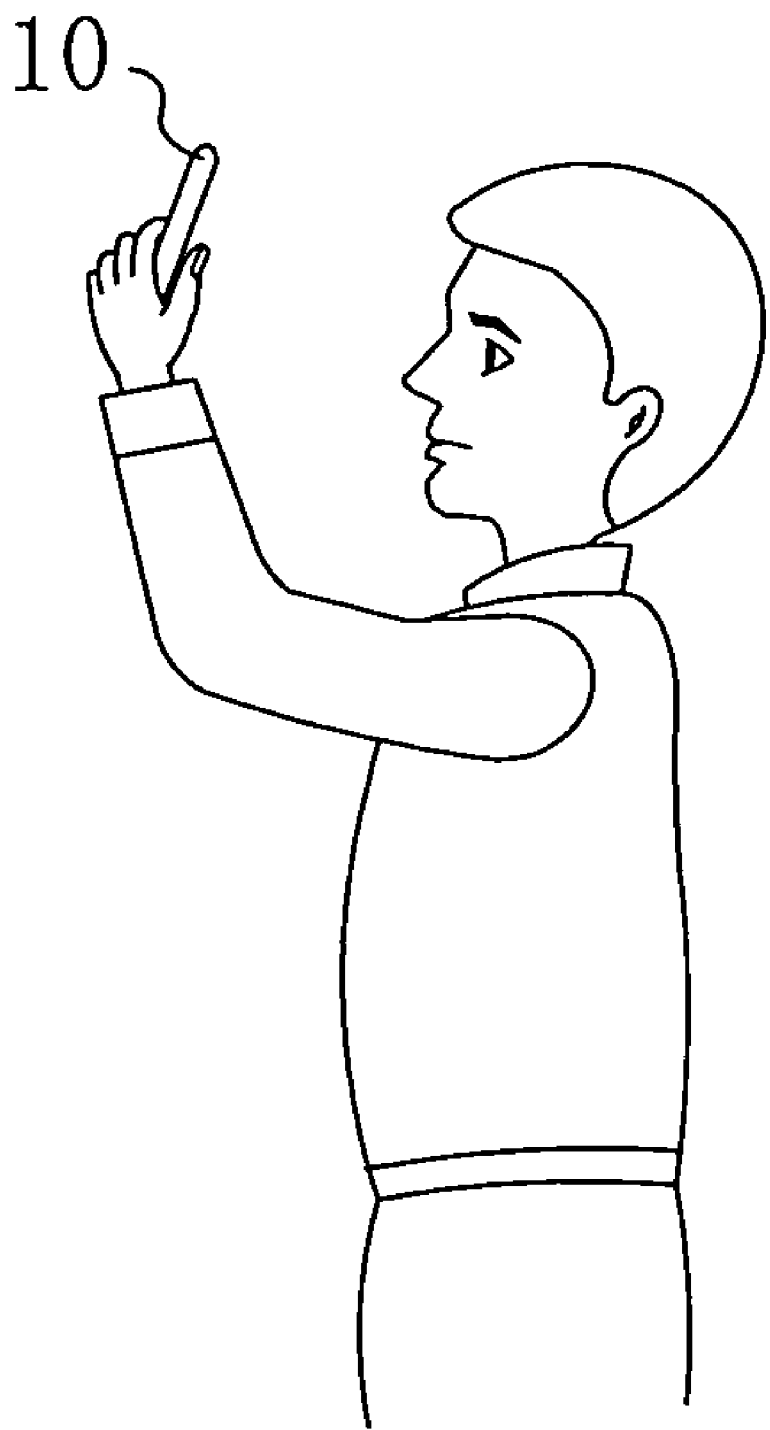
FIG. 19 shows a cellular mobile phone having an authentication function which is held by a user.

In the first place, a user (person who is to be authenticated) holds the cellular mobile phone 10 of FIG. 3 as shown in FIG. 19 to capture a plurality of iris images (N images: N is an integer equal to or greater than 2) (Step 1b). At the time of capturing, the user holds the cellular mobile phone 10 at a position distant from his/her eye by a predetermined distance (e.g., about 20 cm in the case where the camera 11 is a unifocal camera) and adjusts the position of the cellular mobile phone 10 such that the entire area of the iris is included in a view field and proper focus is attained while confirming that an iris image captured by the camera 11 is displayed on the monitor 13. Then, the user depresses a capture button which is allocated to one of the operation buttons 14. This operation is repeated N times. Alternatively, a capture start button may be depressed once to obtain a series of N frame images while taking a moving video picture.

Following processes 2b to 7b are carried out by the authentication processing section 26. Herein, a method disclosed in Document 1 mentioned above is basically used. General features of the method of Document 1 are as shown below:

(I) Determine the iris perimeter (iris/sclera border) and the pupil perimeter (pupil/iris border) to extract an iris region;

(II) Transform the extracted iris region from the xy-rectangular coordinate system to the r$\theta$-polar coordinate system;

(III) Determine analysis regions (by concentrically dividing the iris region into 8 ring parts);

(IV) Subject the iris region to multi-scale 2-d Gabor transform and binarize a signal obtained after the Gabor transform. The binarized signal is used as an iris code;

(V) Compare (exclusive OR) an iris code generated at the time of authentication with an iris code registered in advance to calculate the hamming distance between the two compared codes; and (VI) If the hamming distance is lower than a threshold value, accept the user as a registrant but otherwise reject as a non-registrant.

Figure 5:
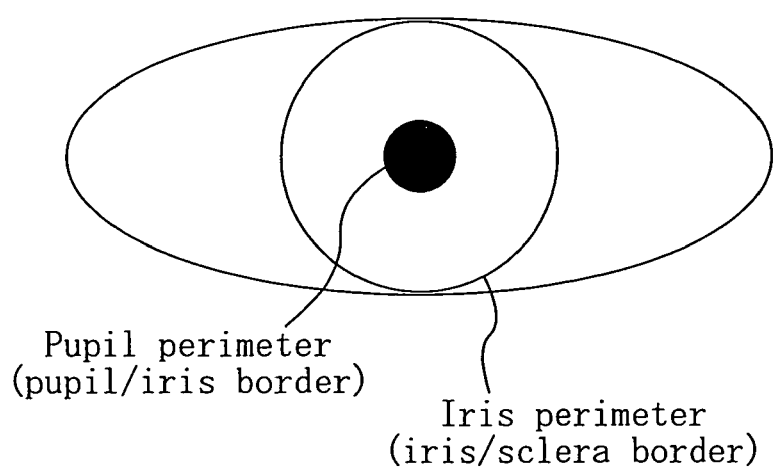
FIG. 5 shows the pupil perimeter and the iris perimeter.
Figure 6:
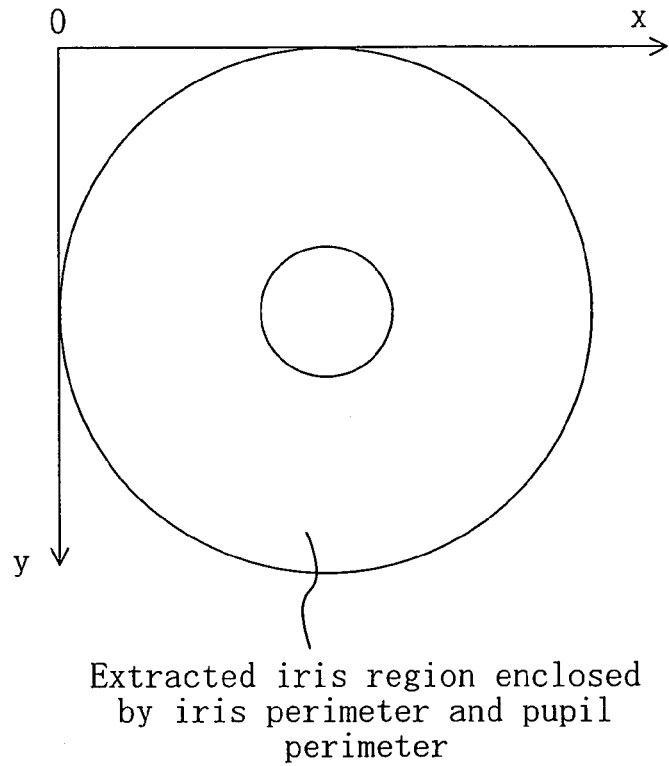
FIG. 6 shows an iris image over a xy-rectangular coordinate system.
Figure 7:
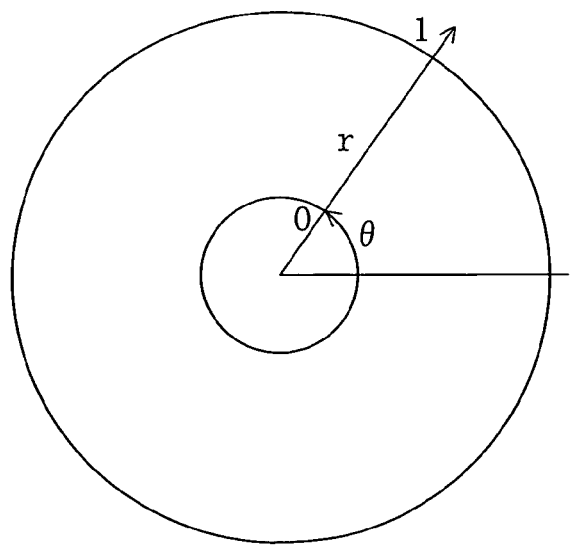
FIG. 7 shows an iris image over an rθ-polar coordinate system.

FIG. 5 shows the positions of the iris perimeter and the pupil perimeter for Step (I). FIG. 6 shows an area enclosed by the iris perimeter and the pupil perimeter which is extracted as an iris region and expressed in the xy-rectangular coordinate system. At this point in time, the effect of translation of the iris region has been absorbed. FIG. 7 shows the iris region expressed in the r$\theta$-polar coordinate system where the center of the pupil is at the center of the system (transformation of Step (II)). The value of r at the pupil perimeter is set to 0 and the value of r at the iris perimeter is set to 1, whereby the difference in the degree of opening of the pupil and the effect of expansion/contraction of the pupil are absorbed.

Figure 8:
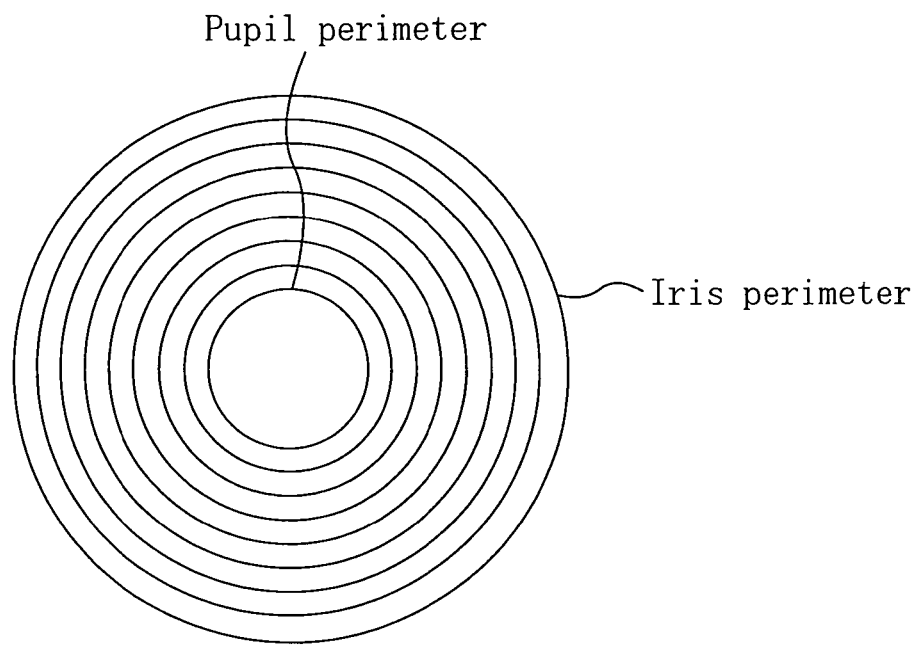
FIG. 8 shows analysis bands which are determined by concentrically dividing an iris into eight ring parts.
Figure 9:
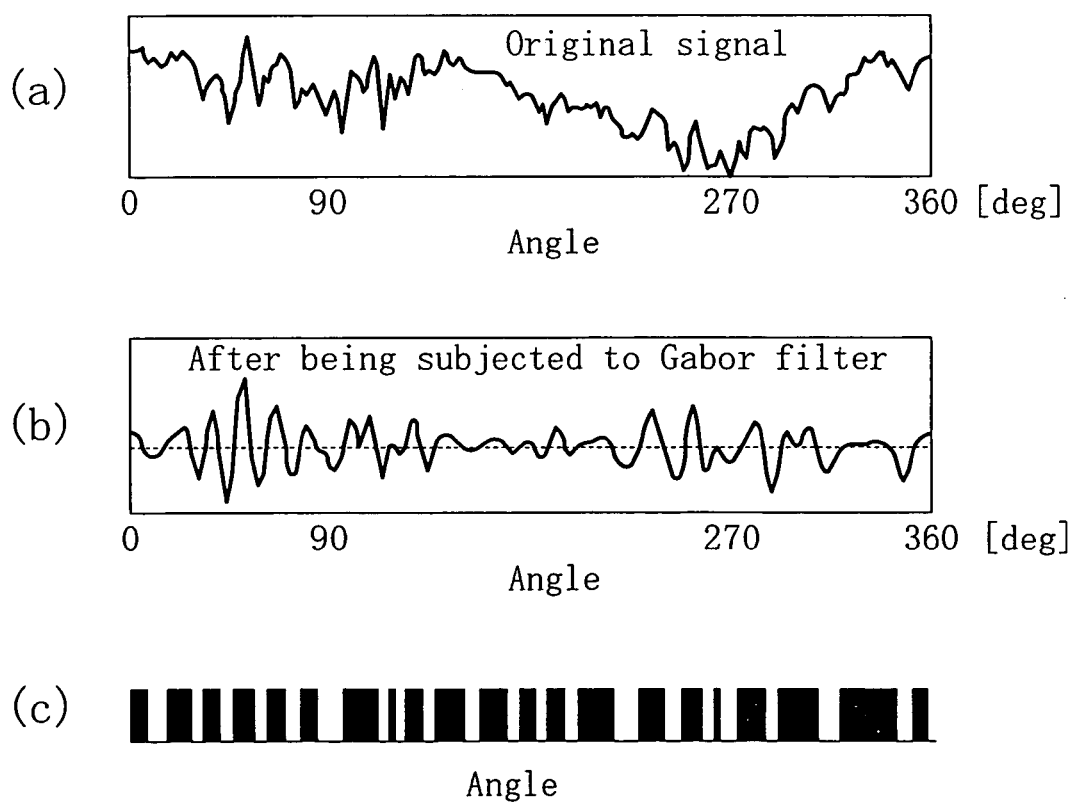
FIG. 9 shows a method for generating an iris code.

FIG. 8 shows 8 ring-shaped analysis regions determined at Step (III). FIG. 9 illustrates generation of an iris code at Step (IV) wherein brightness signal (a) obtained after the analysis regions of FIG. 8 have been determined is subjected to Gabor transform (signal (b)), and a resultant signal is binarized (signal (c)). Although the signal is actually a two-dimensional signal, but it is shown in the form of a one-dimensional signal for simplicity of illustration. Signal (a) is an angular direction brightness signal in one of the 8 rings. Although, in an actual case, multi-scale Gabor transform is employed and even a single-scale Gabor transform output includes a real part and an imaginary part, signals (b) and (c) are the results derived from the real part of the Gabor transform output for a certain scale. The position of each bit of the binary iris code (c) corresponds to a position over the iris image.

In view of such iris authentication process of Document 1, embodiment 1 of the present invention performs the process described below.

In the first place, N iris images are captured (Step 1b). An iris region is extracted from each of the plurality of captured images (Step 2b). For each extracted iris region image, the coordinate system is transformed from the rectangular coordinate system to the polar coordinate system (Step 3b). Feature extraction is performed with band limitation by, for example, Gabor transform (Step 4b). N iris codes (for example, 2048 bits) are generated from the band-limited images as iris data which represents the feature amount for authentication (Step 5b). The above process is performed in the same way as above-described process (I) to (IV). As a result, the iris codes from which the effects of translation, expansion/contraction, the difference in the degree of opening of the pupil, the eccentricity of the pupil, etc., are removed, are generated from a plurality of iris images.

Figure 10:
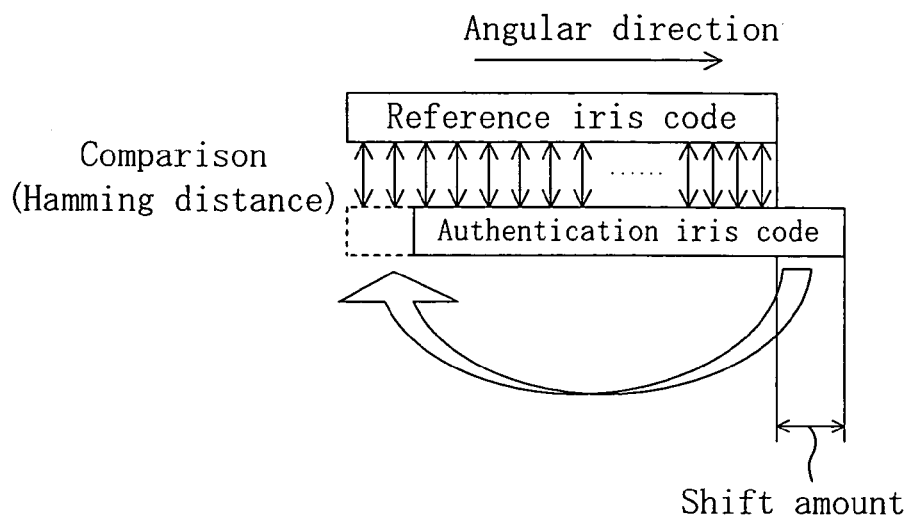
FIG. 10 shows a method for rotationally compensating an iris code.

Then, rotational compensation is performed between iris codes as pre-processing for synthesis of the plurality of iris codes (Step 6b). That is, there is a possibility that a deviation in an angular direction exists among the generated N iris codes due to the tilt of a face or the rotation of an eye ball, and this deviation has been corrected. As shown in FIG. 10, one of the N iris codes (for example, the first generated iris code) is employed as a reference iris code, the other iris codes are rotated to a predetermined area to perform matching, and the shift amount is determined such that the humming distance becomes minimum, whereby the rotational compensation is performed. In FIG. 10, the iris code for one of the 8 rings in the iris region is shown for simplicity of illustration.

The pupil of a human eye contracts according to a change in the environment, such as brightness, or the like, or a change in the physical condition, the state of feeling, or the like. Therefore, the effect of video noise on the iris pattern, or the like, cannot be reduced by simple addition of a plurality of images. Thus, registration is performed with no effect of expansion/contraction through the above process at Steps 2b to 6b.

Figure 11:
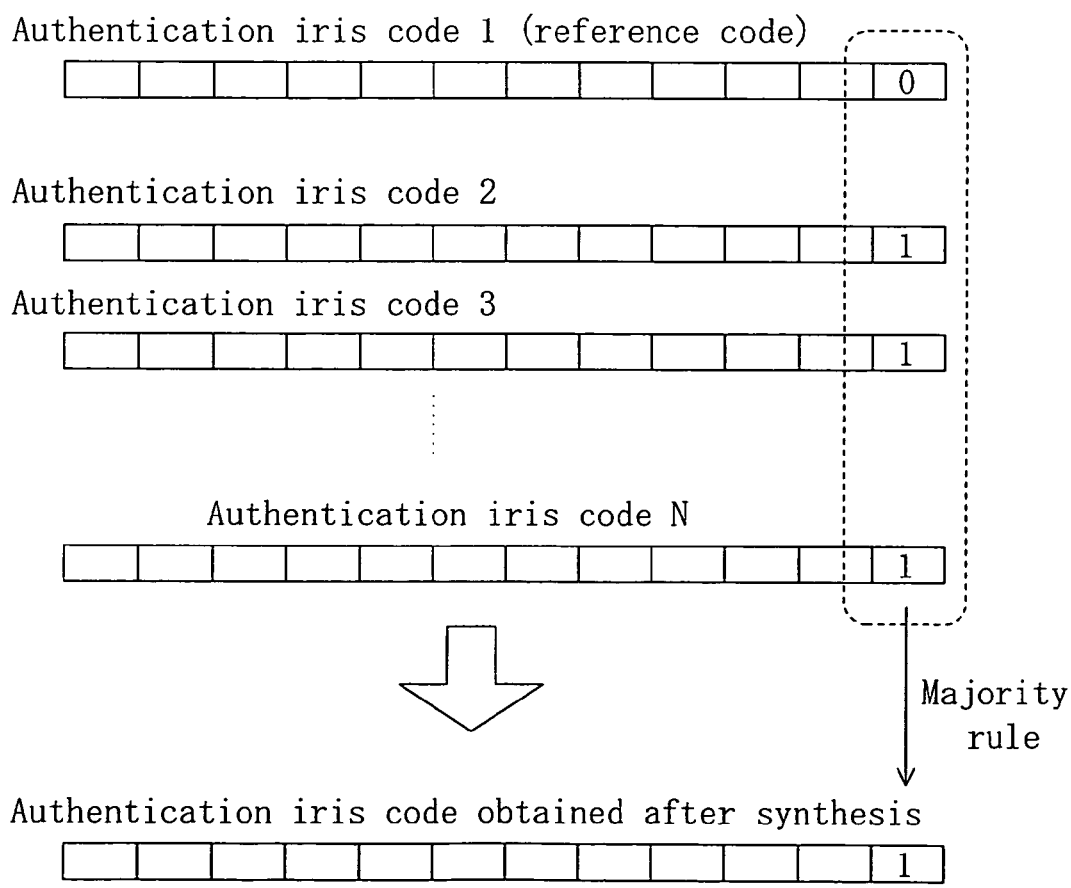
FIG. 11 shows a method for synthesizing bits of iris codes based on a majority rule.

Then, the plurality of iris codes obtained after the rotational compensation are synthesized into a single iris code (Step 7b), whereby a final iris code for authentication is obtained. The synthesis of the iris codes is realized by selecting the value of each bit of the N iris codes obtained after the rotational compensation from "0" or "1" based on a majority rule. That is, the value of each bit of the iris code obtained after the synthesis is determined based on the majority rule. In the example shown in FIG. 11, the bit values at the lowest bit of the iris codes include more "1"s than "0"s. Accordingly, the bit value of the lowest bit of the iris code obtained after the synthesis is determined to be "1".

Returning to FIG. 1, the iris code synthesized in process 7b is compared with the iris code registered in advance in the iris database 212 to perform authentication using matching score (humming distance: HD value) (Step 9). If the hamming distance is equal to or lower than predetermined threshold value TH1, the user is accepted as a registrant but otherwise rejected as a non-registrant. Then, the final authentication result is displayed on the monitor 13 of the cellular mobile phone 10 of FIG. 3.

The process in the registration section 214 is substantially the same as that described above. For example, an iris code for registration is generated from a plurality of images through processes 1a to 7a which are the same as processes 1b to 7b in the authentication section 215. The generated registration iris code is registered in the iris database 212 (Step 8).

As described above, according to embodiment 1, after the registration in a rotational direction, a plurality of iris codes obtained from a plurality of iris images are synthesized into a single iris code by determining the value of each bit based on a majority rule. With such an operation, the iris codes are stably obtained, and therefore, iris authentication can be performed with reduced false rejection (FR) even when images captured by a low S/N camera are used.

Figure 12:
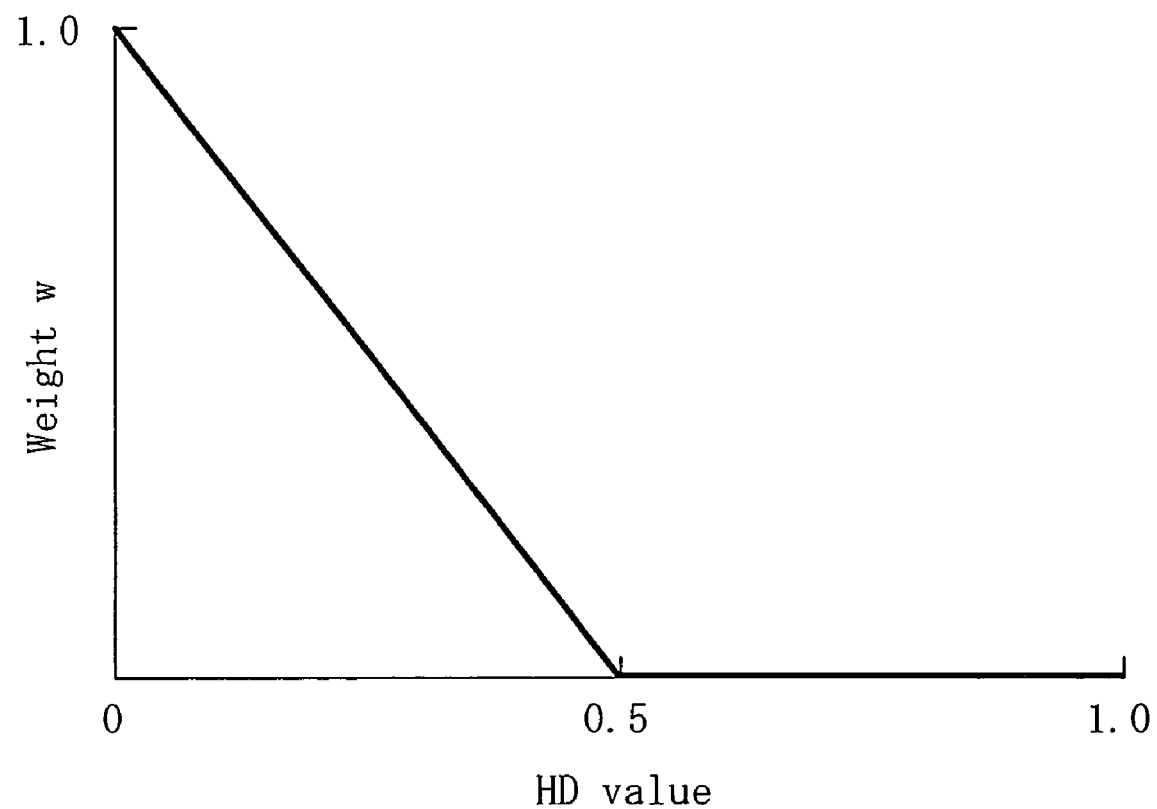
FIG. 12 shows a distribution of the weight used in the iris code synthesis that is performed based on a weighted majority rule.

The operation based on the majority rule, which is performed in the synthesis of iris codes, is not limited to the simple majority rule described above in embodiment 1. Various methods are possible within the scope of the present invention. For example, a weight is added to each of the iris codes to be synthesized, and the operation based on the majority rule is performed on the iris codes including the added weights. The weight is determined for each iris code, for example, according to the relationship shown in FIG. 12 based on the minimum HD value obtained at the time of comparison with the registered iris code. By adding the weights as illustrated in FIG. 12, information of an iris code which gives a small HD value is used with higher priority in the synthesis of iris codes.

In the above example of embodiment 1, at the time of authentication, all of processes 2b to 7b and 9 are performed at the terminal. However, in an alternative example of embodiment 1, only process 1b for capturing a plurality of images is performed at the terminal, the plurality of captured images are sent to a server through a network, and the images are subjected to processes 2b to 7b and 9 on the server. In this case, the result of authentication is calculated on the server, a calculation result is sent to the terminal through the network again, and the result of authentication is displayed on the monitor 13 of the terminal. Likewise, in an alternative example, at the time of registration, process 1a for capturing a plurality of images is performed at the terminal, the plurality of captured images are sent to the server through the network, and processes 2a to 7a and 8 are performed on the server.

Figure 20:
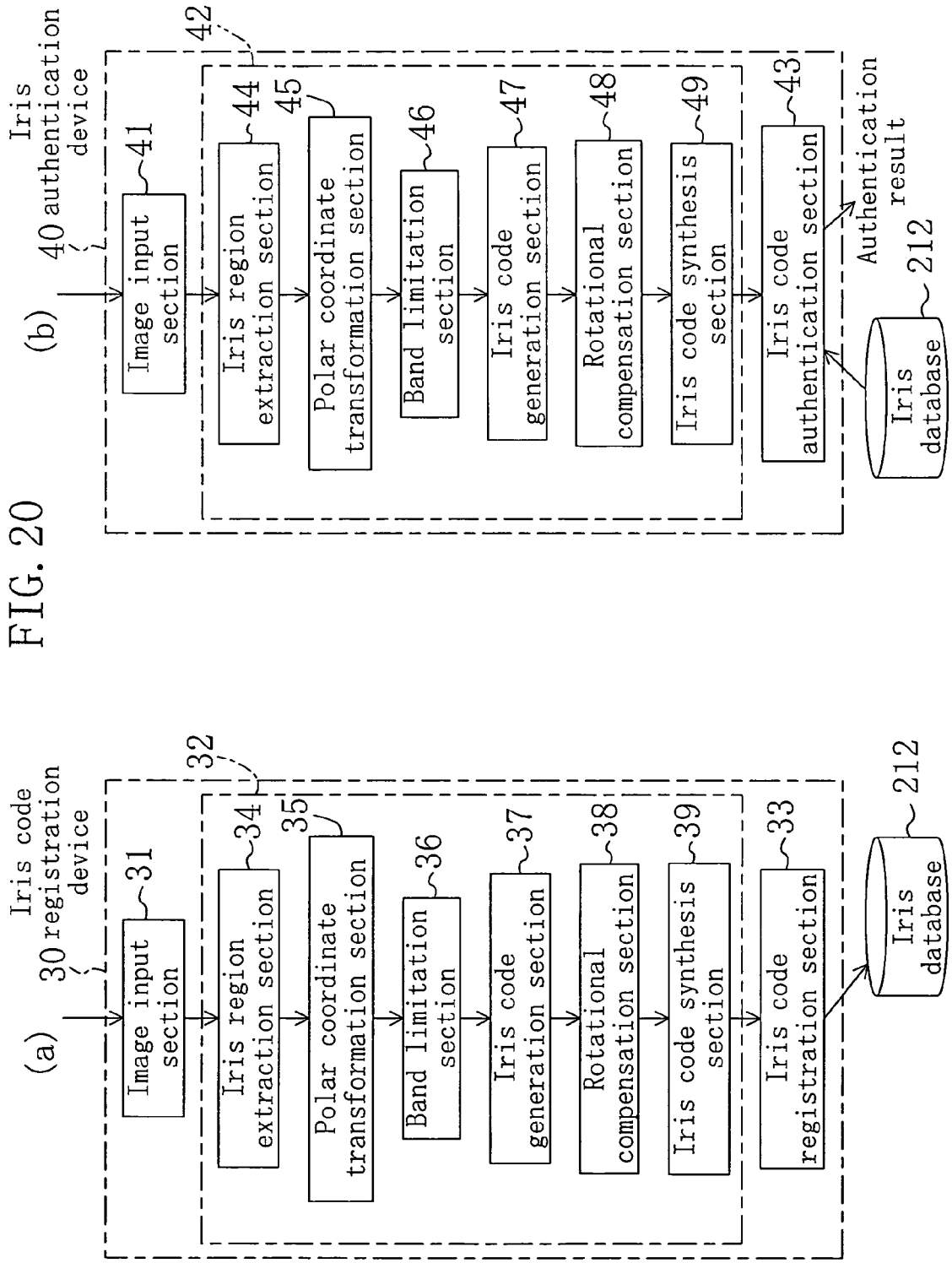
FIG. 20 is a block diagram showing a device structure according to embodiment 1 of the present invention.

FIG. 20 is a block diagram showing an example of the device structure according to embodiment 1. Part (a) shows an iris code registration device. Part (b) shows an iris authentication device. The iris code registration device 30 shown in FIG. 20(a) includes an image input section 31, iris code generation means 32 for generating an iris code from a plurality of images input to the image input section 31, and an iris code registration section 33 for registering the iris code generated by the iris code generation means 32 in the iris database 212. The iris authentication device 40 shown in FIG. 20(b) includes an image input section 41, iris code generation means 42 for generating an iris code from a plurality of images input to the image input section 41, and an iris code authentication section 43 for comparing the iris code generated by the iris code generation means 42 with the iris codes registered in the iris database 212 to perform authentication. The iris code generation means 32 and 42 generate iris codes according to the method described in embodiment 1. The iris code generation means 32 and 42 respectively include iris region extraction sections 34 and 44 for detecting an iris region from an image input to the image input sections 31 and 41; polar coordinate transformation sections 35 and 45 for transforming the coordinate system from the rectangular coordinate system to the polar coordinate system for an image of an iris region obtained by the iris region extraction sections 34 and 44; band limitation sections 36 and 46 for performing band limitation on the coordinate-transformed images output from the polar coordinate transformation sections 35 and 45; iris code generation sections 37 and 47 for generating iris codes from the band-limited images output from the band limitation sections 36 and 46; rotational compensation sections 38 and 48 for rotationally compensating the iris codes output from the iris code generation sections 37 and 47 in a circumferential direction; and iris code synthesis sections 39 and 49 for receiving a plurality of rotationally-compensated iris codes output from the rotational compensation sections 38 and 48 and synthesizing the iris codes into a single iris code by determining the bit value of each bit based on a majority rule. The iris codes output from the iris code synthesis sections 39 and 49 are transmitted to the iris code registration section 33 and the iris code authentication section 43, respectively.

EMBODIMENT 2

Figure 13:
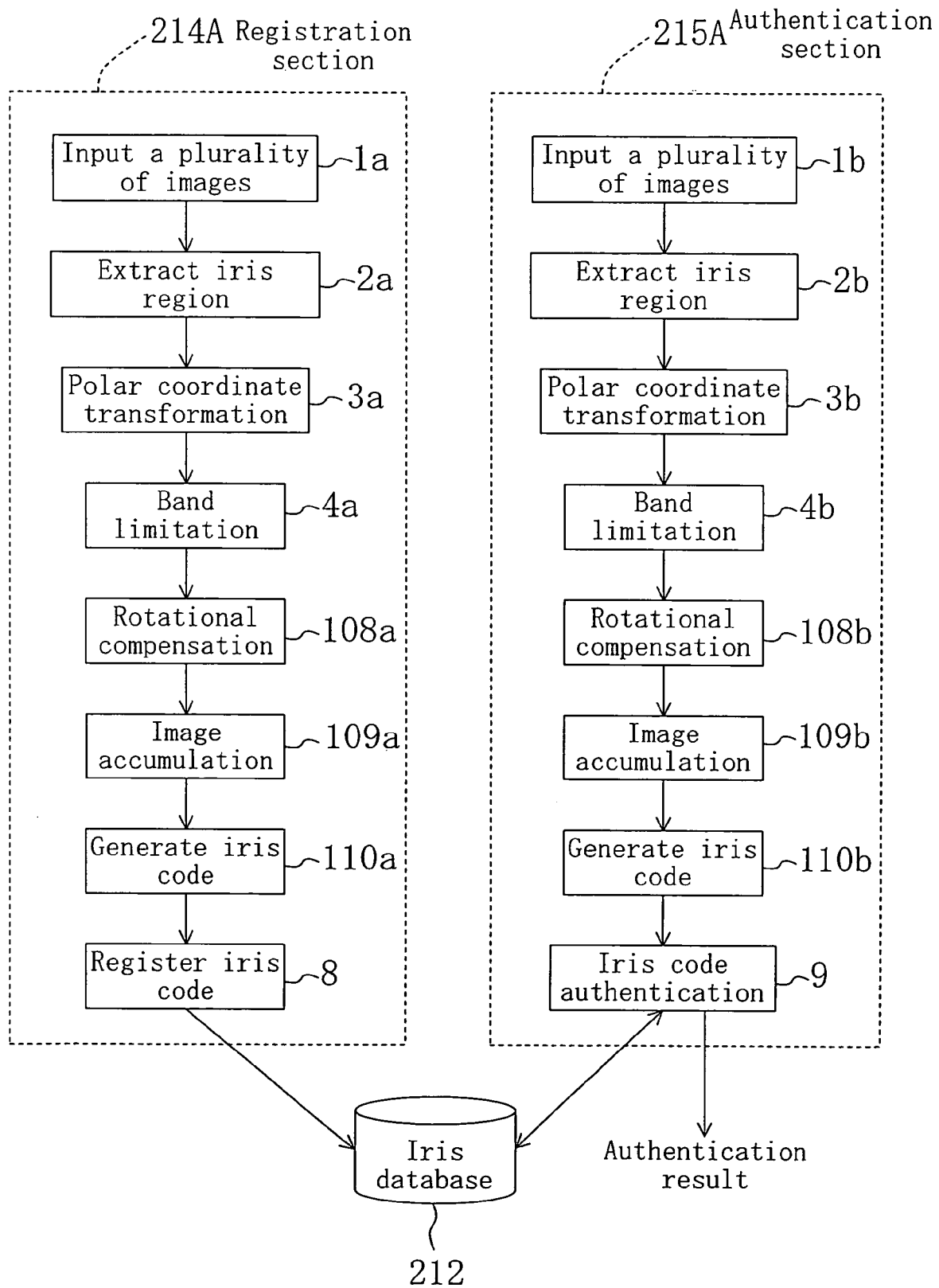
FIG. 13 is a flowchart illustrating an iris authentication method according to embodiment 2 of the present invention.

FIG. 13 is a flowchart illustrating a personal authentication method which uses iris authentication according to embodiment 2 of the present invention. In FIG. 13, the same processes as those of FIG. 1 are denoted by the same reference numerals used in FIG. 1, and descriptions thereof are herein omitted. Embodiment 2 is different from embodiment 1 in that in embodiment 2 an image obtained after Gabor transform performed as the band limitation process (4a, 4b) is subjected to rotational compensation (108a, 108b), addition/accumulation (109a, 109b), and iris code generation (110a, 110b).

Figure 14:
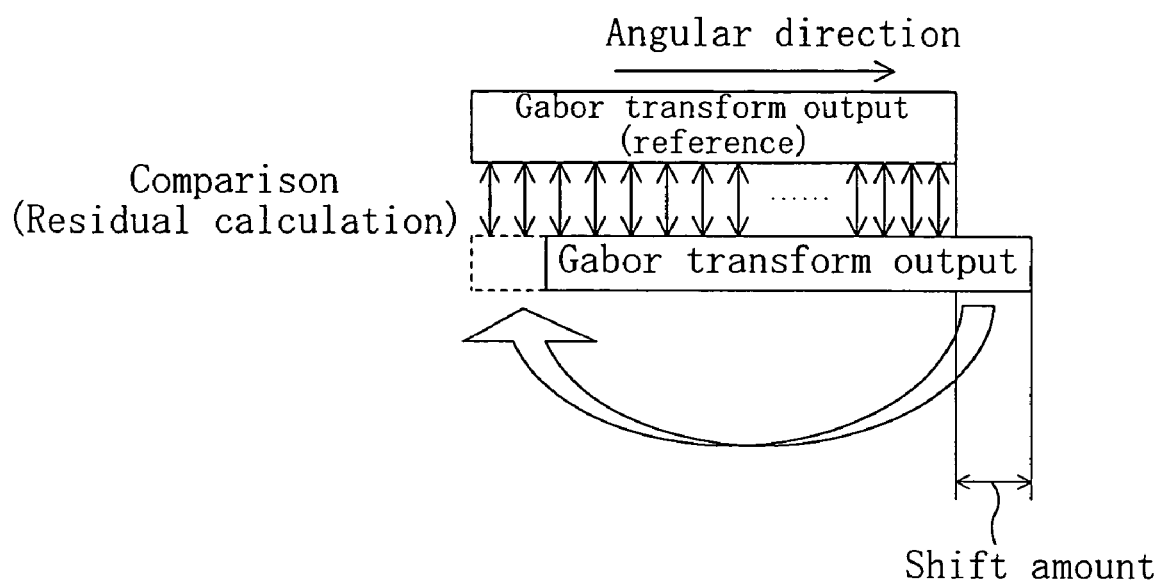
FIG. 14 shows a method for rotationally compensating the output of Gabor transform.

The rotational compensation performed on the Gabor transform output is performed by determining the shift amount in an angular direction such that the difference (sum of squared residuals or sum of absolute residuals) between the rotationally-compensated Gabor transform output and the reference Gabor transform output becomes the minimum. In FIG. 14, for simplicity of illustration, the real part of a result of the Gabor transform performed on one of the 8 rings of the iris region for a certain scale is expressed.

Figure 15:
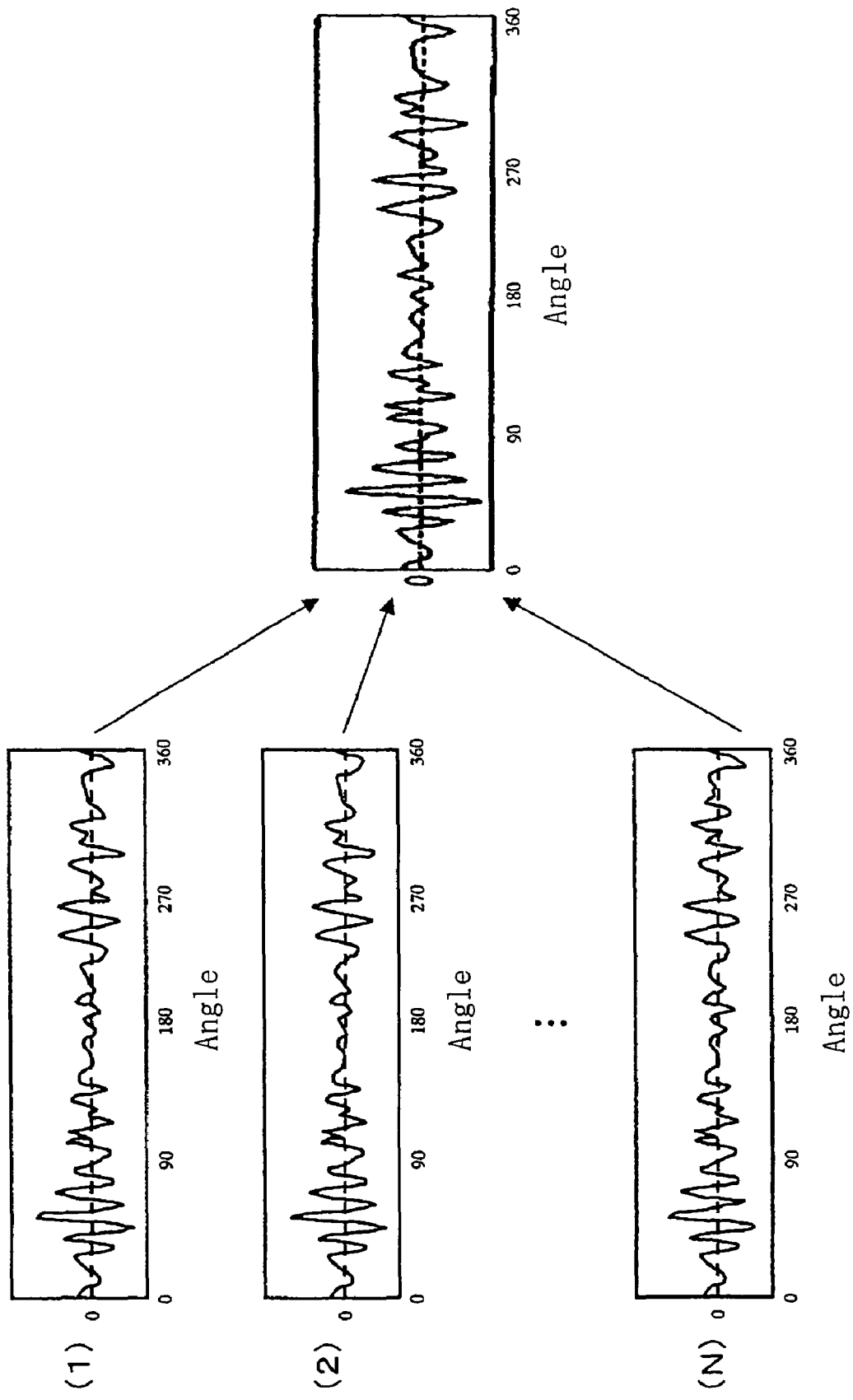
FIG. 15 illustrates accumulation of the outputs of Gabor transform after rotational compensation.

Then, as shown in FIG. 15, the outputs of Gabor transform performed on a plurality of images (N images) after rotational compensation are added together and accumulated as a single image. An iris code is then generated from the accumulated image.

As described above, according to embodiment 2, iris images extracted from a plurality of images are subjected to polar coordinate transformation, band limitation, and rotational compensation, and then accumulated as a single image. From the accumulated image, an iris code is generated. Thus, even when the SIN of each original image is not sufficiently high, noise components in the accumulated single image are canceled by each other, and accordingly, the high SIN is obtained. Therefore, an iris code is stably obtained so that iris authentication is performed with reduced false rejection (FR) rate.

In an alternative example of embodiment 2, as described in embodiment 1, at the time of authentication, only process 1b for capturing a plurality of images is performed at the terminal, the plurality of captured images are sent to a server through a network, and the images are subjected to processes 2b to 4b, 108b to 110b, and 9 on the server. Likewise, in an alternative example, at the time of registration, process 1a for capturing a plurality of images is performed at the terminal, the plurality of captured images are sent to the server through the network, and processes 2a to 4a, 108a to 110a, and 8 are performed on the server.

Figure 21:
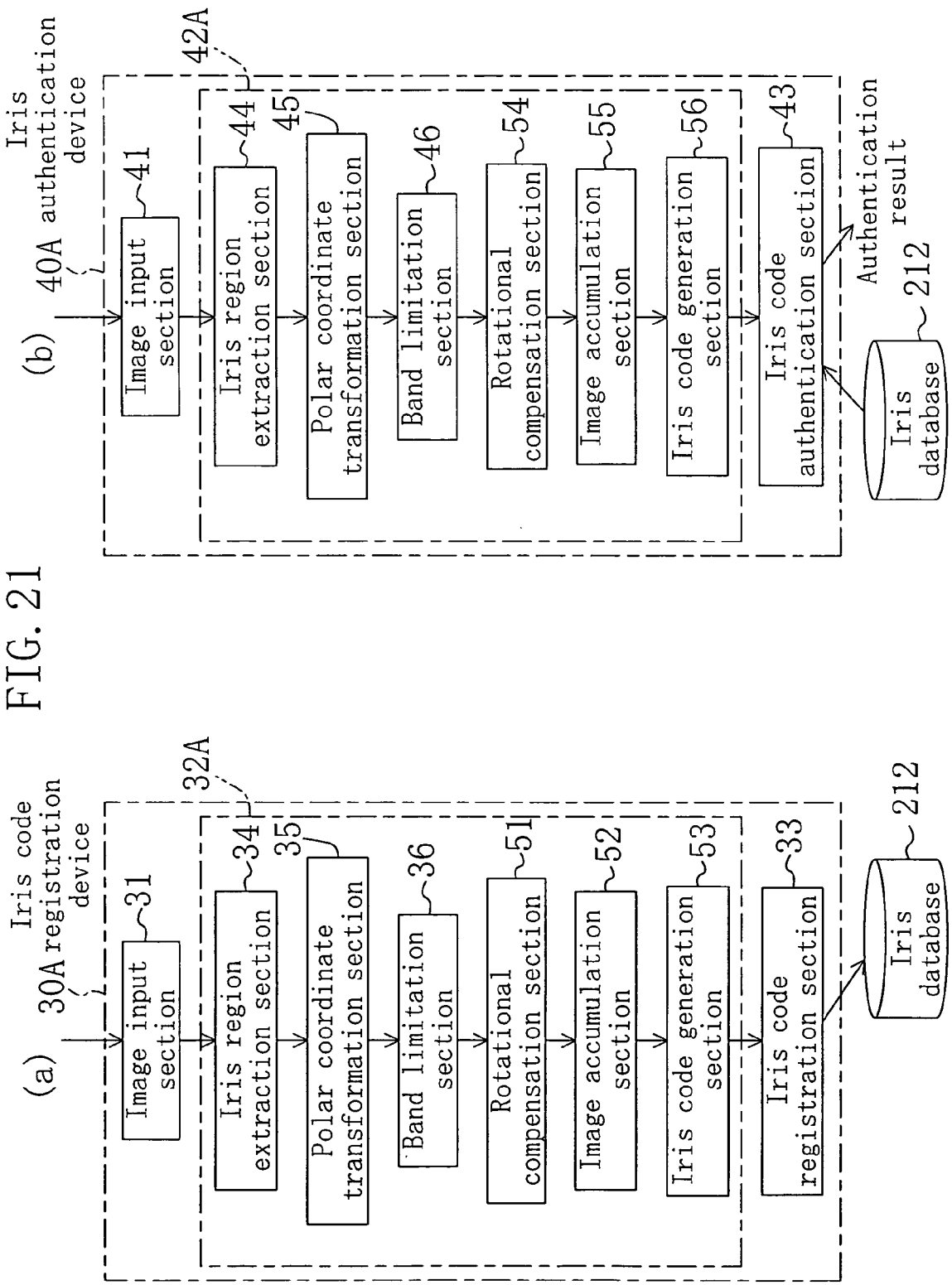
FIG. 21 is a block diagram showing a device structure according to embodiment 2 of the present invention.

FIG. 21 is a block diagram showing an example of the device structure according to embodiment 2. Part (a) shows an iris code registration device. Part (b) shows an iris authentication device. In FIG. 21, the same components as those of FIG. 20 are denoted by the same reference numerals used in FIG. 20.

The iris code registration device 30A shown in FIG. 21(a) includes an image input section 31, iris code generation means 32A for generating an iris code from a plurality of images input to the image input section 31, and an iris code registration section 33 for registering the iris code generated by the iris code generation means 32A in the iris database 212. The iris authentication device 40A shown in FIG. 20(b) includes an image input section 41, iris code generation means 42A for generating an iris code from a plurality of images input to the image input section 41, and an iris code authentication section 43 for comparing the iris code generated by the iris code generation means 42A with the iris codes registered in the iris database 212 to perform authentication. The iris code generation means 32A and 42A generate iris codes according to the method described in embodiment 2. The iris code generation means 32A and 42A respectively include iris region extraction sections 34 and 44 for detecting an iris region from an image input to the image input sections 31 and 41; polar coordinate transformation sections 35 and 45 for transforming the coordinate system from the rectangular coordinate system to the polar coordinate system for an image of an iris region obtained by the iris region extraction sections 34 and 44; band limitation sections 36 and 46 for performing band limitation on the coordinate-transformed images output from the polar coordinate transformation sections 35 and 45; rotational compensation sections 51 and 54 for rotationally compensating the band-limited images output from the band limitation sections 36 and 46 in a circumferential direction; image accumulation sections 52 and 55 for receiving a plurality of rotationally-compensated images output from the rotational compensation sections 51 and 54 and adding together these images to accumulate them as a single image; and iris code generation sections 53 and 56 for generating iris codes from the images accumulated in the image accumulation sections 52 and 55. The iris codes output from the iris code generation sections 53 and 56 are transmitted to the iris code registration section 33 and the iris code authentication section 43, respectively.

EMBODIMENT 3

Figure 16:
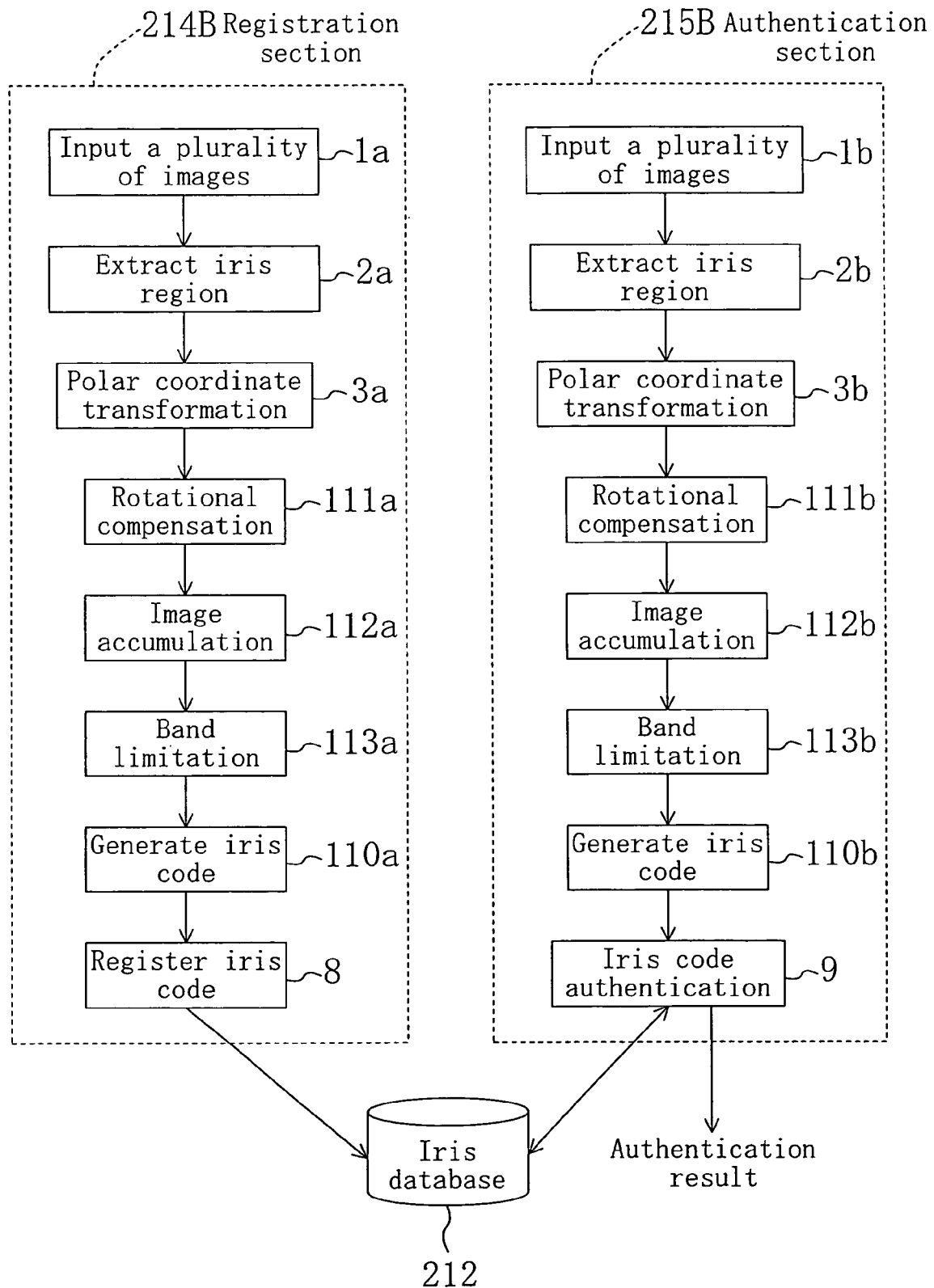
FIG. 16 is a flowchart illustrating an iris authentication method according to embodiment 3 of the present invention.

FIG. 16 is a flowchart illustrating a personal authentication method which uses iris authentication according to embodiment 3 of the present invention. In FIG. 16, the same processes as those of FIG. 1 or FIG. 13 are denoted by the same reference numerals used in FIG. 1 or FIG. 13, and descriptions thereof are herein omitted. Embodiment 3 is different from embodiments 1 and 2 in that in embodiment 3 an image obtained after polar coordinate transformation (3a, 3b) is subjected to rotational compensation (111a, 111b), addition/accumulation (112a, 112b), Gabor transform as the band limitation process (113a, 113b), and iris code generation (110a, 110b).

Figure 17:
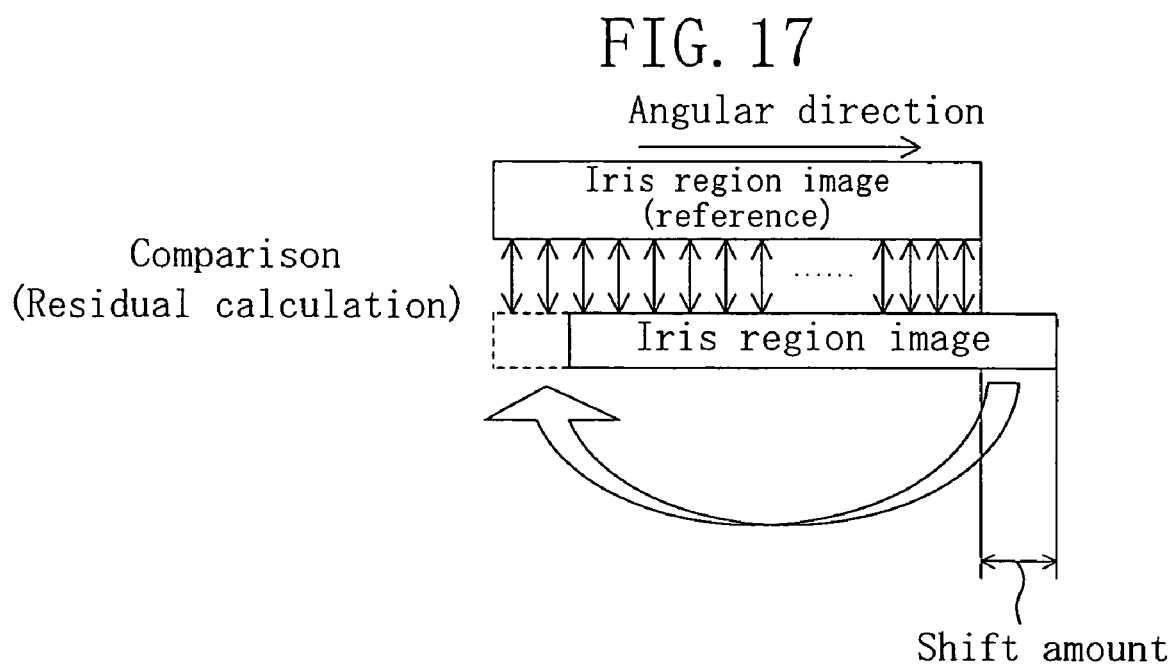
FIG. 17 shows a method for rotationally compensating a coordinate-transformed iris image.

The rotational compensation performed on a coordinate-transformed image is performed by determining the shift amount in an angular direction as shown in FIG. 17 such that the difference (sum of squared residuals or sum of absolute residuals) between the rotationally-compensated image and the reference iris region image (which has been transformed to the polar coordinate system) becomes the minimum.

Figure 18:
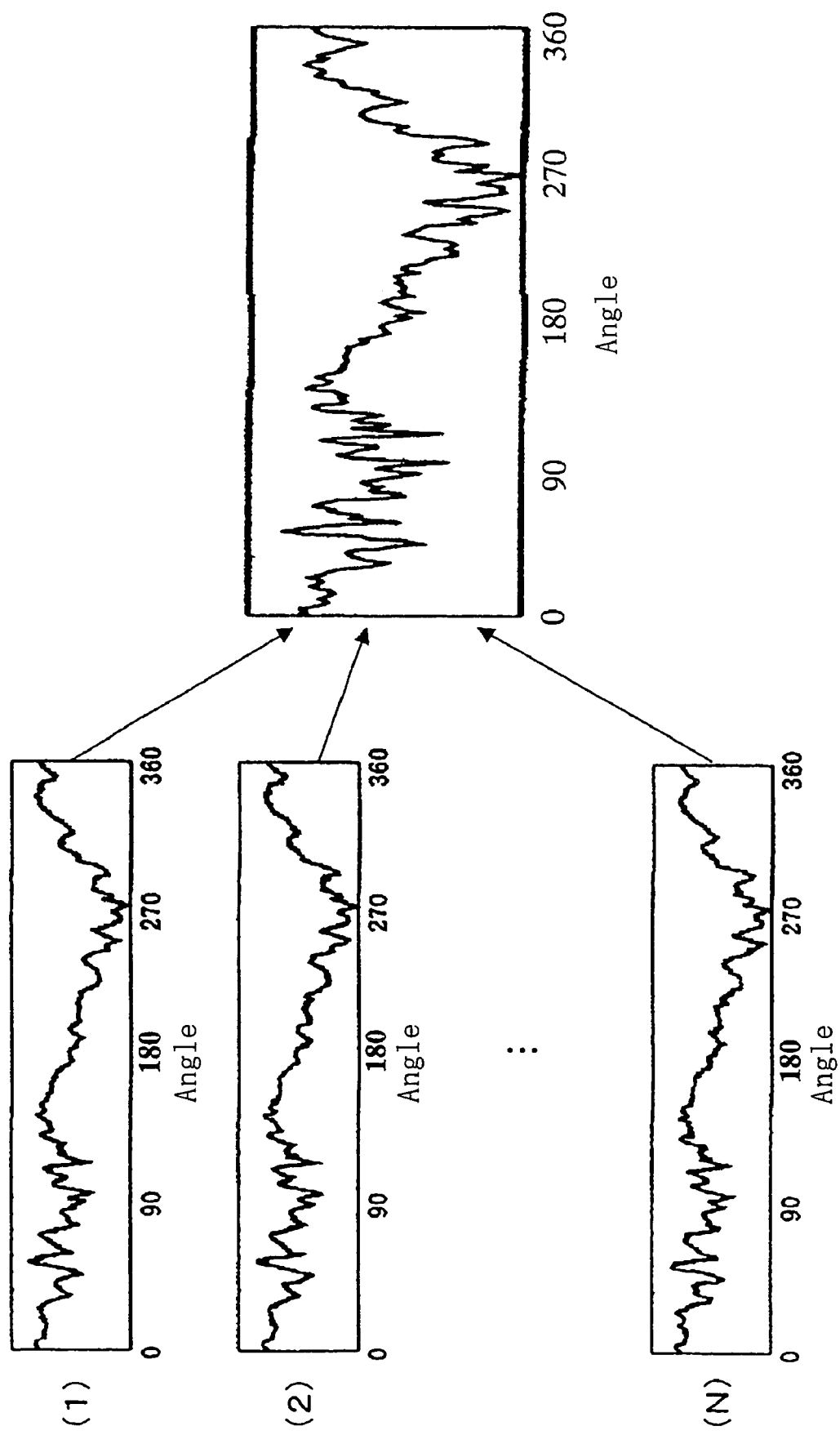
FIG. 18 illustrates accumulation of iris images obtained after polar coordinate transformation.

Then, as shown in FIG. 18, a plurality of rotationally-compensated images (N images) are sequentially added and accumulated as a single image. By such accumulation of images, random noise components in the images are canceled by each other, and accordingly, the S/N of the images are ameliorated. The accumulated images are subjected to Gabor transform, and an iris code is generated from the Gabor-transformed images.

As described above, according to embodiment 3, iris images extracted from a plurality of images are subjected to polar coordinate transformation and band limitation and then accumulated as a single image. The accumulated image is subjected to band limitation, and an iris code is generated from the band-limited image. Thus, the iris code is generated from an image having ameliorated S/N, in which noise components are canceled by each other. Therefore, an iris code is stably obtained so that iris authentication is performed with reduced false rejection (FR) rate.

In an alternative example of embodiment 3, as described in embodiments 1 and 2, at the time of authentication, only process 1b for capturing a plurality of images is performed at the terminal, the plurality of captured images are sent to a server through a network, and the images are subjected to processes 2b, 3b, 111b to 113b, 110b, and 9 on the server. Likewise, in an alternative example, at the time of registration, process 1a for capturing a plurality of images is performed at the terminal, the plurality of captured images are sent to the server through the network, and processes 2a, 3a, 111a to 113a, 110a, and 8 are performed on the server.

Figure 22:
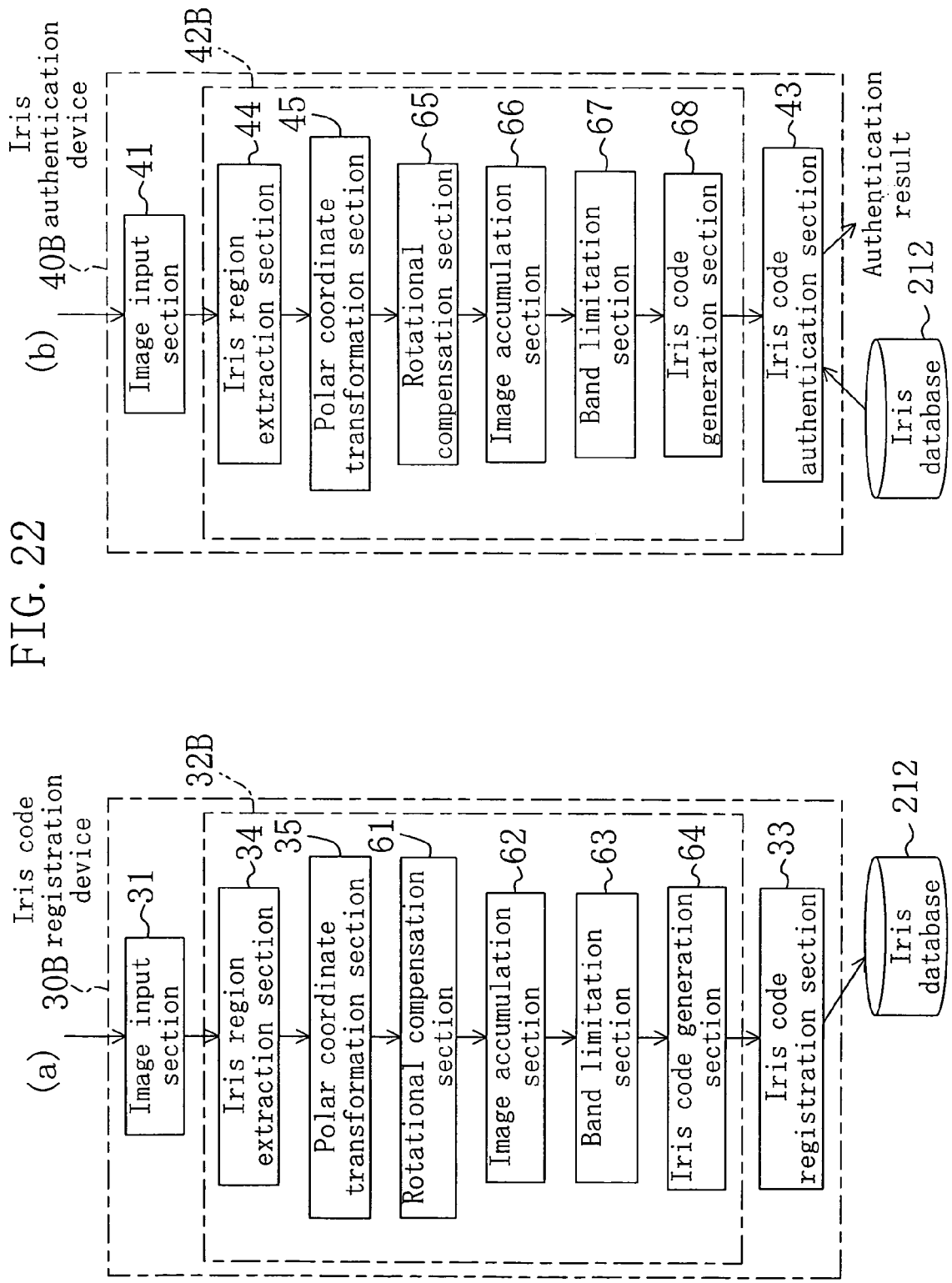
FIG. 22 is a block diagram showing a device structure according to embodiment 3 of the present invention.

FIG. 22 is a block diagram showing an example of the device structure according to embodiment 3. Part (a) shows an iris code registration device. Part (b) shows an iris authentication device. In FIG. 22, the same components as those of FIG. 20 are denoted by the same reference numerals used in FIG. 20.

The iris code registration device 30B shown in FIG. 22(a) includes an image input section 31, iris code generation means 32B for generating an iris code from a plurality of images input to the image input section 31, and an iris code registration section 33 for registering the iris code generated by the iris code generation means 32B in the iris database 212. The iris authentication device 40B shown in FIG. 22(b) includes an image input section 41, iris code generation means 42B for generating an iris code from a plurality of images input to the image input section 41, and an iris code authentication section 43 for comparing the iris code generated by the iris code generation means 42B with the iris codes registered in the iris database 212 to perform authentication. The iris code generation means 32B and 42B generate iris codes according to the method described in embodiment 3. The iris code generation means 32B and 42B respectively include iris region extraction sections 34 and 44 for detecting an iris region from an image input to the image input sections 31 and 41; polar coordinate transformation sections 35 and 45 for transforming the coordinate system from the rectangular coordinate system to the polar coordinate system for an image of an iris region obtained by the iris region extraction sections 34 and 44; rotational compensation sections 61 and 65 for rotationally compensating the coordinate-transformed images output from the polar coordinate transformation sections 35 and 45 in a circumferential direction; image accumulation sections 62 and 66 for receiving a plurality of rotationally-compensated images output from the rotational compensation sections 61 and 65 and adding together these images to accumulate them as a single image; band limitation sections 63 and 67 for performing band limitation on the images accumulated in the image accumulation sections 62 and 66; and iris code generation sections 64 and 68 for generating iris codes from the images output from the band limitation sections 63 and 67. The iris codes output from the iris code generation sections 64 and 68 are transmitted to the iris code registration section 33 and the iris code authentication section 43, respectively.

As for embodiments 2 and 3 described above, the relationship between the number of pixels and the authentication accuracy is supplementarily described.

Figure 23:
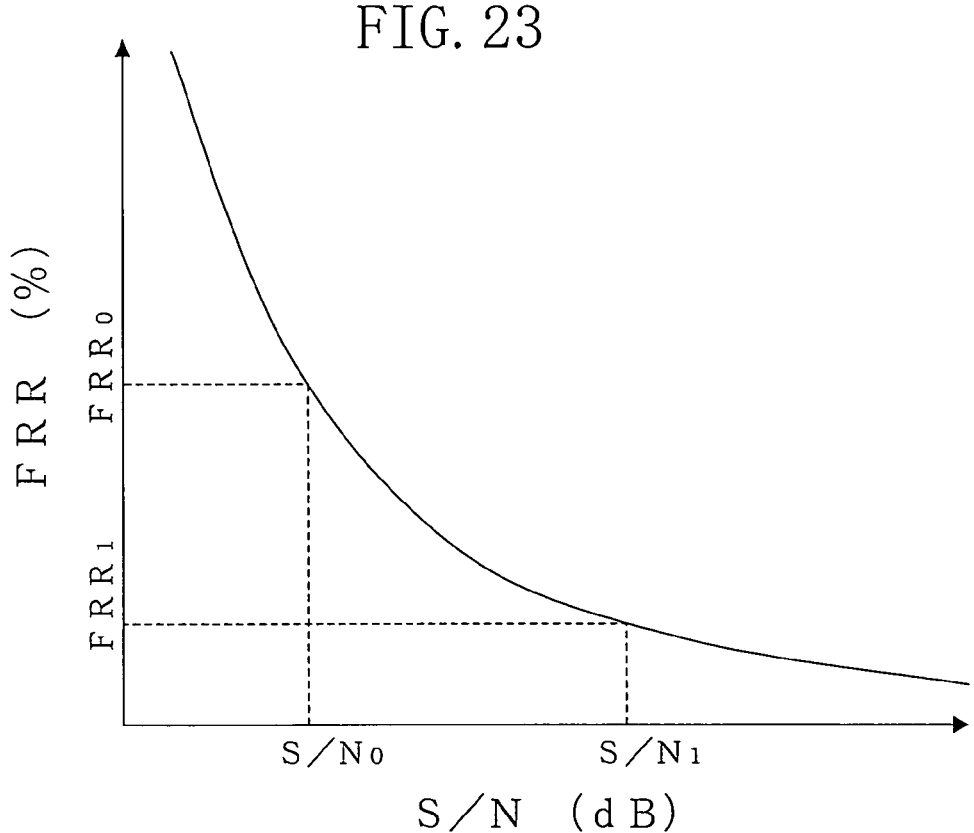
FIG. 23 is a graph illustrating the relationship between the S/N of a camera and the FRR.

In the case where registration and authentication are performed with a single registered image and a single authentication image, the S/N of a camera and the FRR (false rejection rate) have the relationship shown in FIG. 23. That is, as shown in FIG. 23, the FRR increases as the S/N of the camera decreases; conversely, the FRR decreases as the S/N of the camera increases. The relationship between the S/N of the camera and the FRR is determined according to the contrast of the iris pattern in each iris image and the definition of the iris image.

Due to the relationship shown in FIG. 23, if the S/N of a camera used is once determined ($S/N_0$ in FIG. 23), the FRR for a case where registration and authentication are performed with a single registered image and a single authentication image is also determined ($FRR_0$ in FIG. 23). In an alternative case described below, registration and authentication are performed with a registration code generated from a plurality of images and an authentication code generated from a plurality of images.

If n images of the same noise level (images obtained after band limitation or images obtained after polar coordinate transformation in embodiments 2 and 3) are added/accumulated, the signal level is multiplied n times while the noise level is multiplied $\sqrt{n}$ times so that the S/N is ameliorated. That is, the S/N for a single image is:

$$S/N = 20\log\frac{S}{N},$$

and the S/N for a case where n images are added/accumulated is:

$$S/N = 20\log\frac{nS}{\sqrt{n}\,N} = 20\log\frac{S}{N} + 10\log n.$$

Thus, the S/N for n images is improved as compared with the S/N for a single image by 10 log n.

Figure 24:
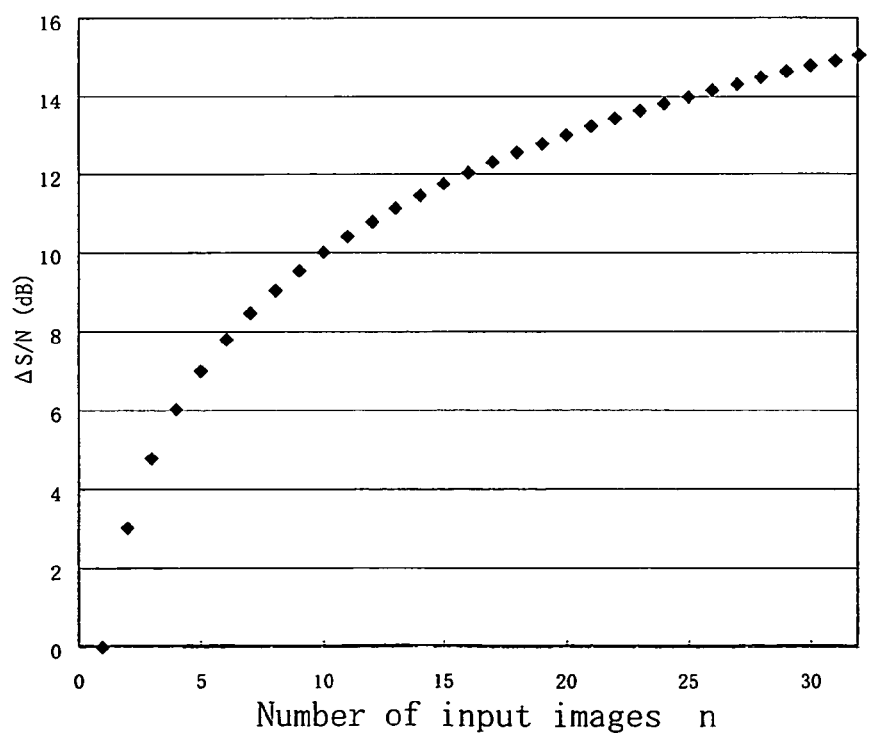
FIG. 24 is a graph illustrating the relationship between the number of input images (n) and the improved amount of the S/N (ΔS/N).

In FIG. 23, the number of input images is determined according to the difference between a target S/N ($S/N_1$) corresponding to a target FRR ($FRR_1$) and the S/N of a camera used ($S/N_0$), i.e., $\Delta S/N$. FIG. 24 shows the relationship between the number of input images (n) and the improved amount of the S/N ($\Delta S/N$). As seen from FIG. 24, for the numbers of images, 2, 4, 8, 16, and 32, the S/N is improved by about 3 dB, 6 dB, 9 dB, 12 dB, and 15 dB, respectively.

In the above-described examples of the embodiments, iris codes are generated using the same method in both registration and authentication. However, it is not necessary to use the same iris code generation method for the registration process and the authentication process. For example, at the time of registration, an iris code is generated from a single iris image using a high quality (high S/N) camera according to the method disclosed in Document 1, while at the time of authentication an iris code is generated using any of the methods of the embodiments of the present invention. Alternatively, in the case where any of the methods of the embodiments of the present invention is used in both registration and authentication, different methods may be used in registration and authentication.

In the above embodiments, band limitation for feature extraction is realized by Gabor transform, but the feature extraction method is not limited thereto. For example, feature extraction may be realized by band limitation using a different band pass filter.

In the above-described embodiments, examples of using a cellular mobile phone which has an authentication function have been described. However, it is apparent that the effects of the present invention are obtained not only with the cellular mobile phone having an authentication function but also with other authentication devices, and such cases are also within the scope of the present invention.

The entirety or part of the processes described in the above embodiments can be carried out by executing a program on a computer. For example, a computer and a memory for storing an iris authentication program are incorporated in an iris authentication device. This iris authentication program instructs the computer to perform the iris code generation step of generating an authentication iris code using the iris code generation method described in the above embodiments and the authentication step of comparing the authentication iris code with an iris code registered in the database to perform authentication.

INDUSTRIAL APPLICABILITY

An iris code generation method of the present invention is unsusceptible to the influence of video noise, a variation in the pupil diameter, and the like, and therefore stably generates iris codes. Thus, the iris code generation method of the present invention is useful, for example, in applications of personal authentication using a terminal device which incorporates a low S/N camera with high probability.

The invention claimed is:

1. An iris code generation method, comprising a processor to perform the steps of:
inputting a plurality of images;
detecting iris regions from the plurality of images;
transforming coordinate system from a rectangular coordinate system to a polar coordinate system for an image of each of the detected iris regions;
performing band limitation on each of the coordinate-transformed images;
generating an iris code from each of the band-limited images;
rotationally compensating each of the generated iris codes in a circumferential direction; and
synthesizing the rotationally-compensated iris codes into a single iris code by determining a bit value of each bit based on a majority rule that selects a bit value of the single iris code based on a majority occurrence of bit values in the iris codes.

2. The iris code generation method according to claim 1, wherein the band limitation is realized by Gabor transform.

3. A personal authentication method using an iris image, comprising a registration process and an authentication process,
the registration process performed by a processor including the steps of:
generating an iris code from an iris image; and
registering the generated iris code in a database,
the authentication process performed by a processor including the steps of:
generating an iris code from an iris image; and
comparing the generated iris code with the iris code registered in the database to perform authentication,
wherein, in at least one of the registration process and the authentication process, generation of the iris code is performed using the iris code generation method of claim 1.

4. An iris code registration device, comprising:
an image input section;
an iris region extraction section for detecting an iris region from an image input to the image input section;
a polar coordinate transformation section for transforming coordinate system from a rectangular coordinate system to a polar coordinate system for an image of the iris regions obtained by the iris region extraction section;
a band limitation section for performing band limitation on the coordinate-transformed image output from the polar coordinate transformation section; an iris code generation section for generating an iris code from the band-limited image output from the band limitation section;
a rotational compensation section for rotationally compensating the iris code output from the iris code generation section in a circumferential direction;
an iris code synthesis section for receiving a plurality of rotationally-compensated iris codes output from the rotational compensation section and synthesizing the plurality of iris codes into a single iris code by determining a bit value of each bit based on a majority rule that selects a bit value of the single iris code based on a majority of occurrences of bit values in the iris codes; and
an iris code registration section for registering the iris code output from the iris code synthesis section in a database.

5. An iris authentication device, comprising:
an image input section;
an iris region extraction section for detecting an iris region from an image input to the image input section;
a polar coordinate transformation section for transforming coordinate system from a rectangular coordinate system to a polar coordinate system for an image of the iris regions obtained by the iris region extraction section;
a band limitation section for performing band limitation on the coordinate-transformed image output from the polar coordinate transformation section;
an iris code generation section for generating an iris code from the band-limited image output from the band limitation section;
a rotational compensation section for rotationally compensating the iris code output from the iris code generation section in a circumferential direction;
an iris code synthesis section for receiving a plurality of rotationally-compensated iris codes output from the rotational compensation section and synthesizing the plurality of iris codes into a single iris code by determining the bit value of each bit based on a majority rule that selects a bit value of the single iris code based on a majority of occurrences of bit values in the iris codes; and
an iris code authentication section for comparing the iris code output from the iris code synthesis section with an iris code registered in a database to perform authentication.

6. An iris authentication program stored on a computer-readable medium for instructing a computer to execute:
an iris code generation step of generating an authentication iris code using the iris code generation method of claim 1; and
an authentication step of comparing the authentication iris code with an iris code registered in a database to perform authentication.

7. The method of claim 1 wherein the majority rule selects a particular bit value of the single iris code based on a majority of occurrences of bit values at predetermined bit positions in the iris codes, wherein the predetermined bit positions are predetermined for a particular bit position of the particular bit value in the single iris code.

8. The device of claim 4 wherein the majority rule selects a particular bit value of the single iris code based on a majority of occurrences of bit values at predetermined bit positions in the iris codes, wherein the predetermined bit positions are predetermined for a particular bit position of the particular bit value in the single iris code.

9. The device of claim 5 wherein the majority rule selects a particular bit value of the single iris code based on a majority of occurrences of bit values at predetermined bit positions in the iris codes, wherein the predetermined bit positions are predetermined for a particular bit position of the particular bit value in the single iris code.

10. The method of claim 1 wherein the iris codes have weights, and the majority rule calculates the greatest number of occurrences at least in part by applying the weights to adjust priority of occurrences of bit values of the iris codes.

11. The method of claim 4 wherein the iris codes have weights, and the majority rule calculates the greatest number of occurrences at least in part by applying the weights to adjust priority of occurrences of bit values of the iris codes.

12. The method of claim 5 wherein the iris codes have weights, and the majority rule calculates the greatest number of occurrences at least in part by applying the weights to adjust priority of occurrences of bit values of the iris codes.

* * * * *

UNITED STATES PATENT AND TRADEMARK OFFICE
CERTIFICATE OF CORRECTION

PATENT NO. : 7,486,806 B2  
APPLICATION NO. : 10/495739  
DATED : February 3, 2009  
INVENTOR(S) : Takeo Azuma et al.

Page 1 of 1

It is certified that error appears in the above-identified patent and that said Letters Patent is hereby corrected as shown below:

In claim 4, col. 15, line 65, a paragraph break should be inserted following "coordinate transformation section;"

Signed and Sealed this

Ninth Day of June, 2009

JOHN DOLL  
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,486,806 B2 | Page 1 of 1 |
| APPLICATION NO. | : 10/495739 | |
| DATED | : February 3, 2009 | |
| INVENTOR(S) | : Takeo Azuma | |

It is certified that error appears in the above-identified patent and that said Letters Patent is hereby corrected as shown below:

On the cover page,

Item [*] Notice:   Subject to any disclaimer, the term of this patent is extended or adjusted under 35 USC 154(b) by (698) days Delete the phrase "by 698 days" and insert -- by 954 days --

Signed and Sealed this

Thirtieth Day of March, 2010

David J. Kappos
*Director of the United States Patent and Trademark Office*